US008235282B2

(12) United States Patent
Davila et al.

(10) Patent No.: US 8,235,282 B2
(45) Date of Patent: Aug. 7, 2012

(54) DYNAMIC HOLD DECISIONING USING ADJUSTED DEPOSIT AMOUNT

(75) Inventors: Ricardo Davila, Waxhaw, NC (US); Tommi Levi, Charlotte, NC (US); David Wayne Barnhardt, Huntersville, NC (US); David Alan Minsk, Marvin, NC (US); Roxanne White, Fort Mill, SC (US); Roberto Jose Dominguez, Thomasville, NC (US)

(73) Assignee: Bank of America Corporation, Charlotte, NC (US)

( * ) Notice: Subject to any disclaimer, the term of this patent is extended or adjusted under 35 U.S.C. 154(b) by 188 days.

(21) Appl. No.: 12/703,011

(22) Filed: Feb. 9, 2010

(65) Prior Publication Data

US 2010/0145857 A1 Jun. 10, 2010

Related U.S. Application Data

(63) Continuation-in-part of application No. 11/967,816, filed on Dec. 31, 2007.

(51) Int. Cl.
*G06Q 40/00* (2006.01)

(52) U.S. Cl. .......... 235/379; 235/375; 235/380; 705/35; 705/39; 705/43; 705/44; 705/45

(58) Field of Classification Search .................. 235/379, 235/380, 381, 435, 449, 487, 493; 705/35, 705/36, 37, 42, 43; 382/135, 318
See application file for complete search history.

(56) References Cited

U.S. PATENT DOCUMENTS

| | | | |
|---|---|---|---|
| 5,136,144 A | 8/1992 | Swinton et al. | |
| 6,601,045 B1 | 7/2003 | DePietro et al. | |
| 7,110,981 B1 | 9/2006 | Sidikman et al. | |
| 7,428,984 B1 | 9/2008 | Crews et al. | |
| 2002/0085745 A1 | 7/2002 | Jones et al. | |
| 2004/0089711 A1* | 5/2004 | Sandru | 235/379 |
| 2008/0294541 A1 | 11/2008 | Weinflash et al. | |
| 2009/0166406 A1 | 7/2009 | Pigg et al. | |

OTHER PUBLICATIONS http://www.federalreserve.gov/pubs/regcc/regcc.htm.*
International Search Report and the Written Opinion of the International Searching Authority mailed Apr. 11, 2011 forInternational Application No. PCT/US11/24255.
International Application Serial No. PCT/US08/87691 filed Dec. 19, 2008 entitled "Instant Funds Availability Notification and Fraud Detection", WIPO Publication No. WO 2009/086113 published Jul. 9, 2009.
International Publication No. WO 03/010702 A1 published Feb. 6, 2003 entitled "Method and System for Providing Financial Services".

* cited by examiner

*Primary Examiner* — Daniel Hess
*Assistant Examiner* — Tabitha Chedekel
(74) *Attorney, Agent, or Firm* — Esther F. Queen; Moore & Van Allen

(57) ABSTRACT

Embodiments of the present invention relate to methods and apparatuses for determining, communicating, and/or executing hold decisions for deposit items. For example, a method is provided that includes: (a) receiving information associated with a deposit item; (b) determining an actual deposit amount identified by the deposit item; (c) determining a payee account to receive the deposit item and a drawer account on which the deposit item is drawn; (d) determining a hold limit for the payee account; (e) determining an adjusted deposit amount for the deposit item based at least partially on: (i) the actual deposit amount identified by the deposit item, and (ii) one or more characteristics associated with the drawer account, and (f) determining a hold decision for the deposit item based at least partially on a comparison of the adjusted deposit amount to the hold limit.

34 Claims, 9 Drawing Sheets

DYNAMIC HOLD DECISIONING USING ADJUSTED DEPOSIT AMOUNT

RELATED APPLICATION INFORMATION

The present application claims priority to U.S. patent application Ser. No. 11/967,816, filed on Dec. 31, 2007, published as U.S. Patent Publication No. 2009/0166406, and entitled "Instant Funds Availability Notification and Fraud Detection." This application is incorporated herein by reference in its entirety.

FIELD

In general terms, embodiments of the present invention relate to methods and apparatuses for determining, communicating, and/or executing hold decisions for deposit items.

BACKGROUND

When a deposit item is deposited into a financial account (a "payee account") during a deposit transaction, the financial institution maintaining that payee account does not necessarily want to make funds equal to the deposit amount for the deposit item immediately available. For example, if the funds are made available but the deposit item is ultimately returned (i.e., becomes a "returned deposit item" or "RDI") because, for example, the deposit item is misrepresented, or the financial account on which the deposit item is drawn (the "drawer account") does not have sufficient funds to cover the deposit amount, then the financial institution that maintains the payee account may have to incur any liability later associated with that RDI. As an example, if a deposit amount for an RDI is made available to the payee account, there is a chance that the financial institution will not be able to ultimately recover that amount from the payee account and/or the payee because, for example, that deposit amount has already been spent.

In order to guard against this type of liability risk, the financial institution can use a hold decision apparatus to place a hold on the deposit item until the financial institution has had an opportunity, usually hours or days later, to more carefully evaluate the true liability risks associated with that deposit item. However, these conventional hold decision apparatuses typically implement overly simplistic and unduly conservative hold strategies that recommend holds for (and/or place holds on) deposit items that are not ultimately returned. Thus, apparatuses and methods are needed to more accurately assess the true liability risks associated with deposit items in order to substantially reduce the number of holds placed on deposit items that are not ultimately returned.

SUMMARY OF SELECTED EMBODIMENTS OF THE PRESENT INVENTION

In general terms, embodiments of the present invention relate to methods and apparatuses for determining, communicating, and/or executing hold decisions for deposit items. For example, a method is provided in some embodiments of the present invention. In accordance with some of these embodiments, the method includes: (a) receiving information associated with a deposit item; (b) determining an actual deposit amount identified by the deposit item based at least partially on the information associated with the deposit item; (c) determining a payee account to receive the deposit item based at least partially on the information associated with the deposit item; (d) determining a drawer account on which the deposit item is drawn based at least partially on the information associated with the deposit item; (e) determining a hold limit for the payee account; (f) determining, using a processor, an adjusted deposit amount for the deposit item based at least partially on: (i) the actual deposit amount identified by the deposit item, and (ii) one or more characteristics associated with the drawer account; and (g) determining, using a processor, a hold decision for the deposit item based at least partially on a comparison of the adjusted deposit amount to the hold limit.

In some embodiments of the method, the one or more characteristics associated with the drawer account include one or more characteristics associated with a drawer, where the drawer is associated with the drawer account. In some embodiments of the method, the one or more characteristics associated with the drawer account include one or more characteristics associated with the deposit item. In some embodiments, the one or more characteristics associated with the drawer account include at least one of: (a) an account age associated with the drawer account, or (b) an account type associated with the drawer account. In some embodiments of the method, the one or more characteristics associated with the drawer account include at least one of: (a) a record that the drawer account has gone to loss due to funds not being available for a transaction, (b) an uncollected funds record associated with the drawer account, (c) a dormant/inactive status associated with the drawer account, (d) a record of producing unauthorized monetary replicas associated with the drawer account, (e) an account not located status associated with the drawer account, or (f) a lost/stolen status associated with the drawer account. In some embodiments of the method, determining the adjusted deposit amount for the deposit item includes determining the adjusted deposit amount for the deposit item based at least partially on the actual deposit amount identified by the deposit item multiplied by a scalar, where the value of the scalar is based at least partially on the one or more characteristics associated with the drawer account.

In some embodiments, determining the hold limit for the payee account includes determining the hold limit for the payee account based at least partially on: (a) an account balance associated with the payee account, and (b) one or more other characteristics associated with the payee account. In some of these embodiments, the one or more other characteristics associated with the payee account include at least one of: (a) a total liability balance associated with the payee account, or (b) a record that the payee account has gone to loss due to funds not being available for a transaction. In some embodiments of the method, determining the hold limit for the payee account includes determining the hold limit for the payee account based at least partially on an account balance associated with the payee account multiplied by a scalar, where the value of the scalar is based at least partially on one or more other characteristics associated with the payee account.

In some embodiments, the method further includes communicating, using a communication interface, information associated with the hold decision for the deposit item to at least one of: (a) an automated teller machine (ATM), or (b) a teller interface apparatus operable by a human teller. Additionally or alternatively, in some embodiments of the method, the deposit item includes an item in a single deposit transaction, and receiving the information associated with the deposit item and determining the hold decision for the deposit item are both performed during the single deposit transaction.

As another example, an apparatus is provided in some embodiments of the present invention. In accordance with some of these embodiments, the apparatus includes a communication interface configured to receive information associated with a deposit item, and a processor configured to: (a) determine an actual deposit amount identified by the deposit item based at least partially on the information associated with the deposit item; (b) determine a payee account to receive the deposit item based at least partially on the information associated with the deposit item; (c) determine a drawer account on which the deposit item is drawn based at least partially on the information associated with the deposit item; (d) determine a hold limit for the payee account; (e) determine an adjusted deposit amount for the deposit item based at least partially on: (i) the actual deposit amount identified by the deposit item, and (ii) one or more characteristics associated with the drawer account; and (f) determine a hold decision for the deposit item based at least partially on a comparison of the adjusted deposit amount to the hold limit. In some embodiments of the apparatus, the deposit item includes an item in a single deposit transaction, the communication interface is configured receive the information associated with the deposit item during the single deposit transaction, and the processor is configured to determine the hold decision for the deposit item during the single deposit transaction.

As still another example, a computer program product is provided in some embodiments of the present invention. In accordance with some of these embodiments, the computer program product includes a computer-readable medium, where the computer-readable medium includes computer-executable program code portions stored therein. In some embodiments, the computer-executable program code portions include: (a) a first program code portion configured to receive information associated with a deposit item; (b) a second program code portion configured to determine an actual deposit amount identified by the deposit item based at least partially on the information associated with the deposit item; (c) a third program code portion configured to determine a drawer account on which the deposit item is drawn based at least partially on the information associated with the deposit item; (d) a fourth program code portion configured to determine an adjusted deposit amount for the deposit item based at least partially on: (i) the actual deposit amount identified by the deposit item, and (ii) one or more negative characteristics associated with the drawer account; and (e) a fifth program code portion configured to determine a hold decision for the deposit item based at least partially on a comparison of the adjusted deposit amount to a hold limit. In some embodiments, the computer program product further includes a sixth program code portion configured to determine the hold limit based at least partially on (a) an account balance associated with a payee account, and (b) one or more other characteristics associated with the payee account, where the payee account is held by a payee identified by the deposit item.

BRIEF DESCRIPTION OF THE DRAWINGS

Figure 1:
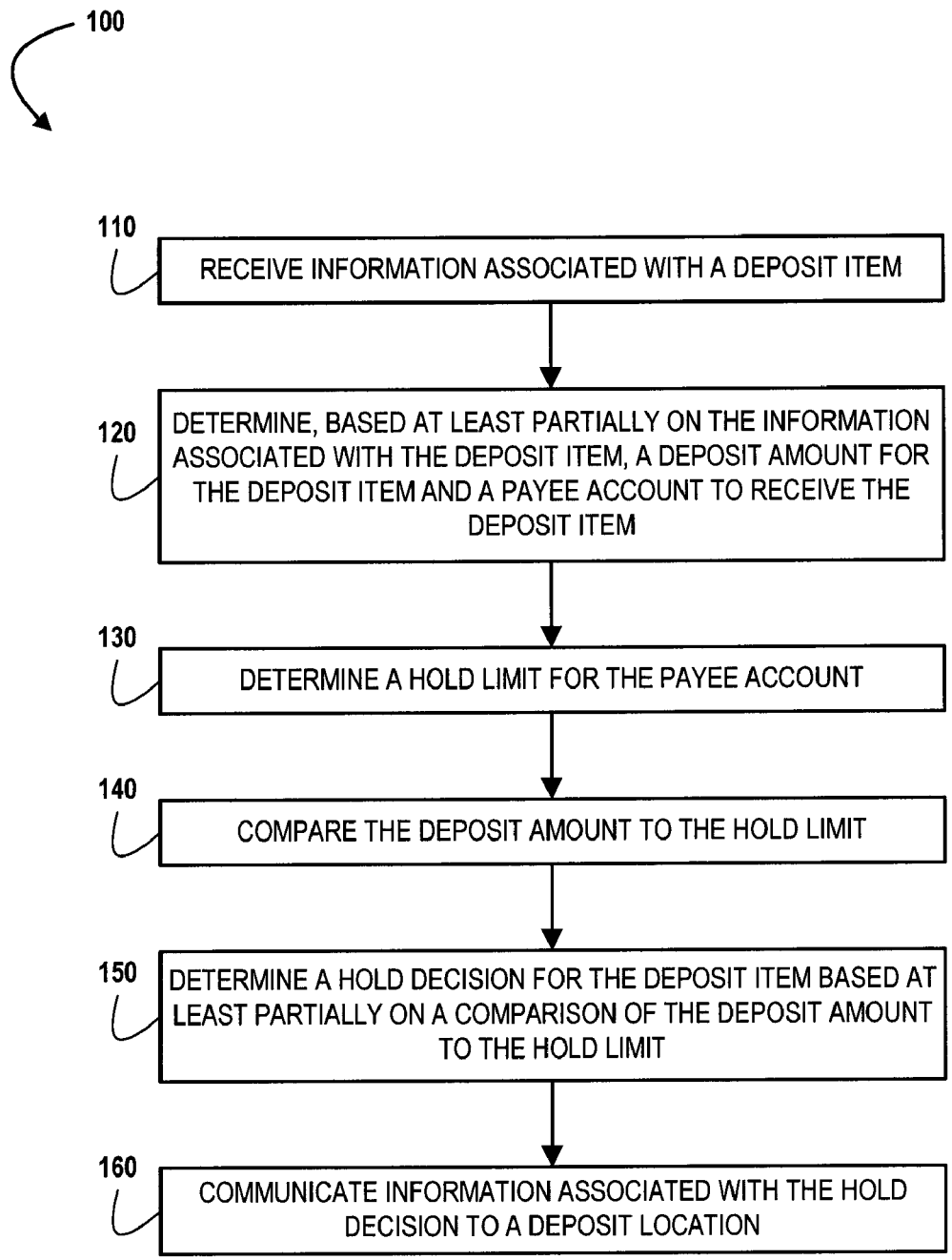
Figure 2:
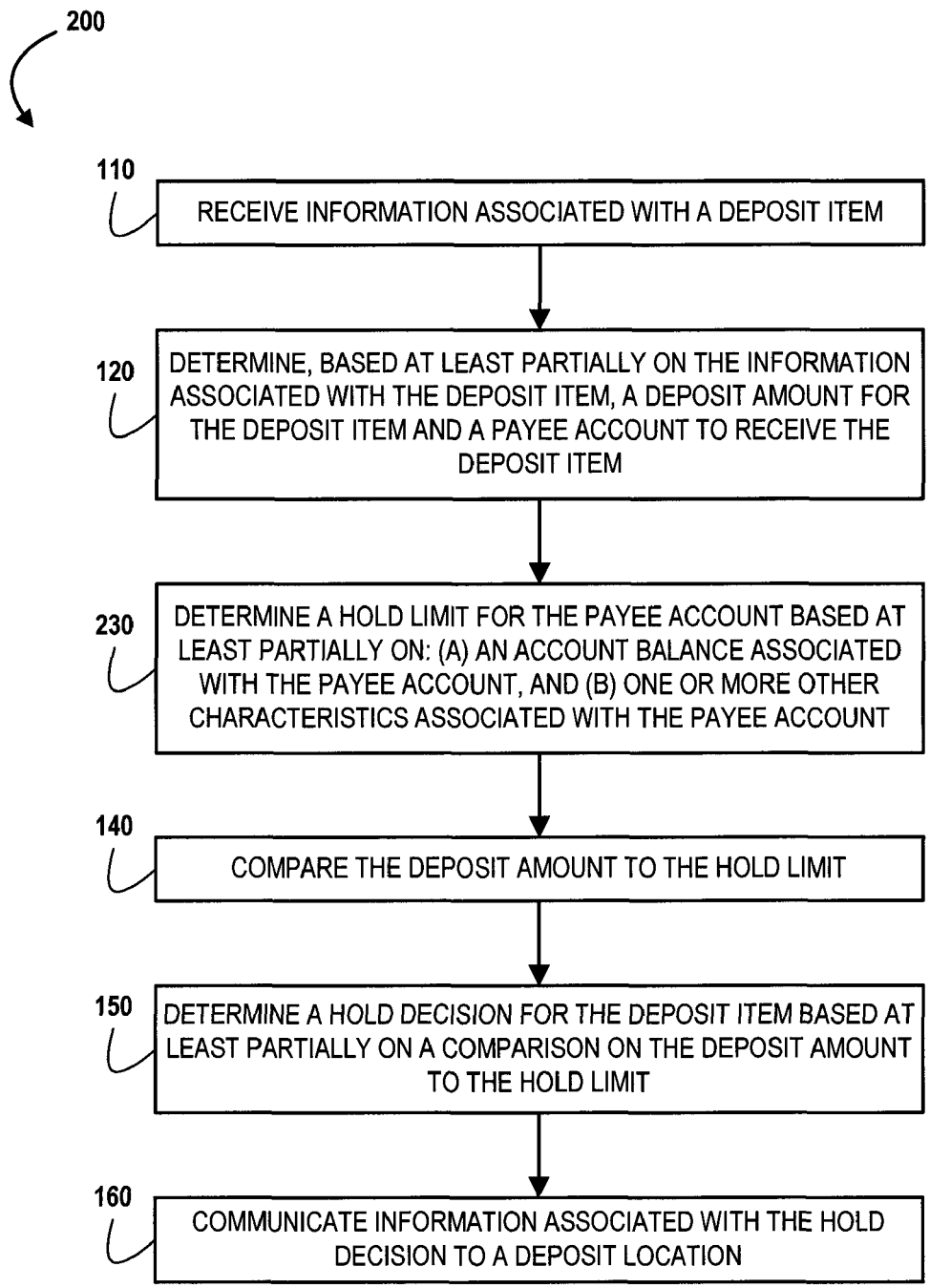
Figure 3:
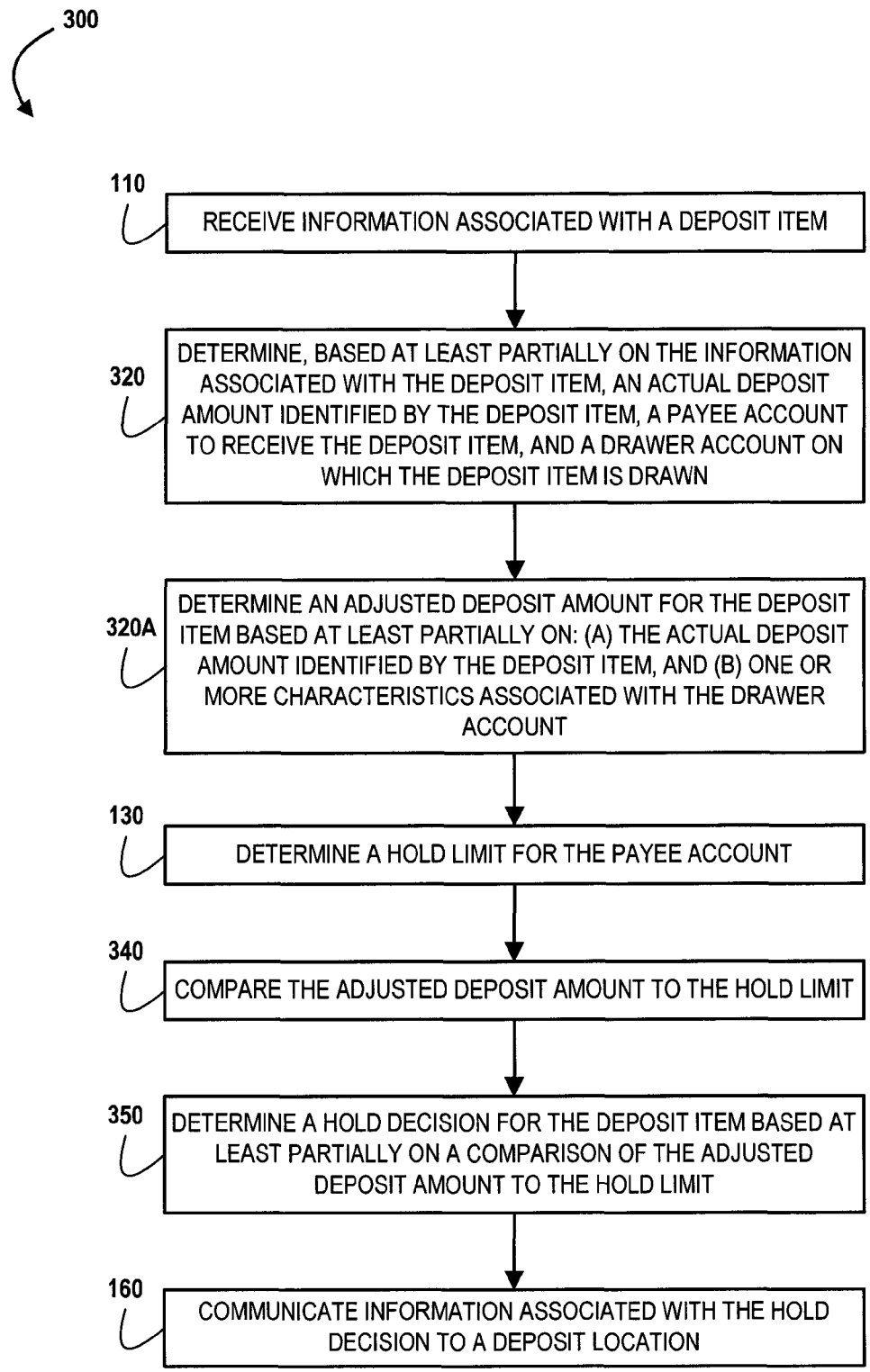
Figure 4:
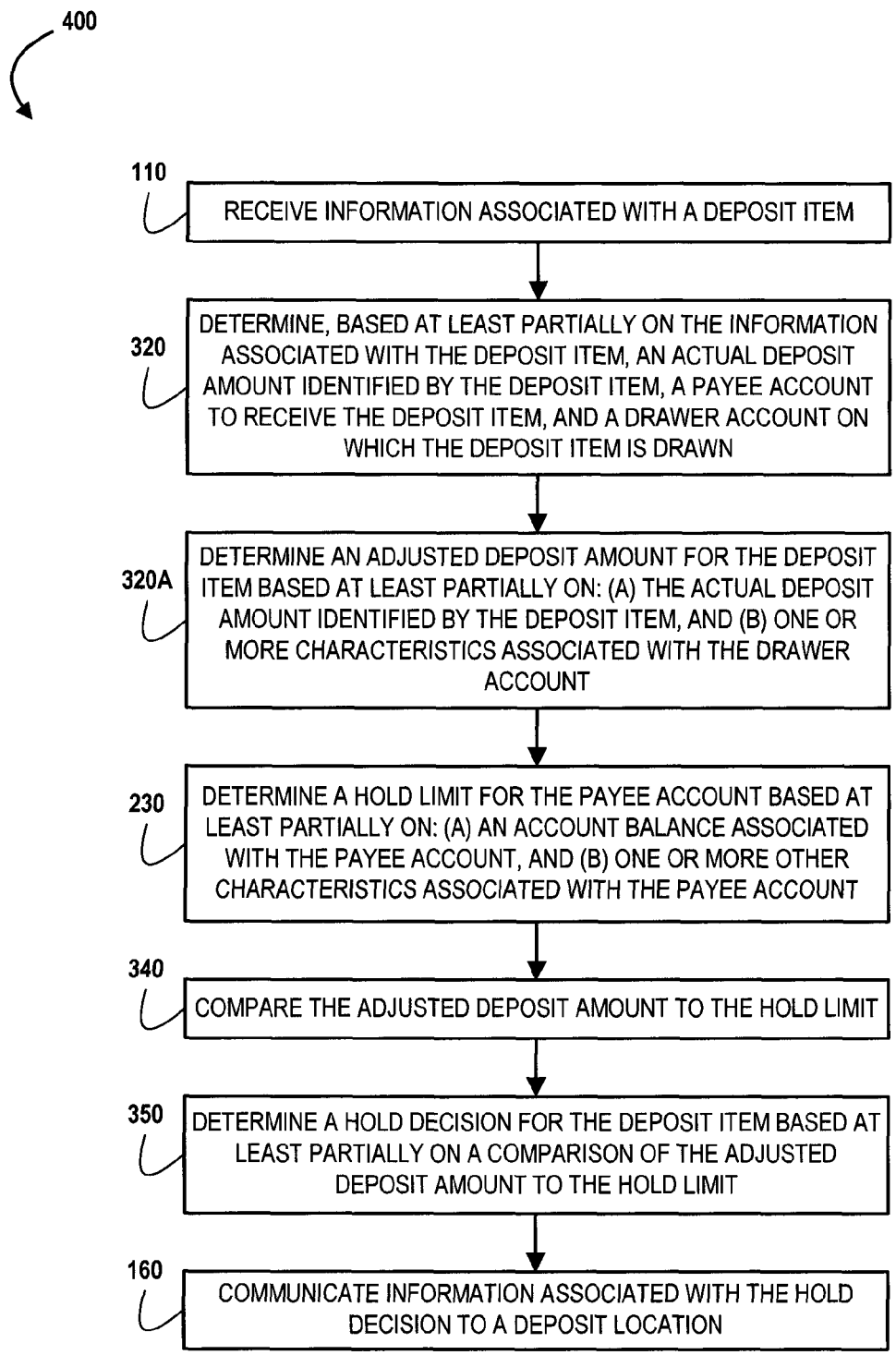
Figure 5:
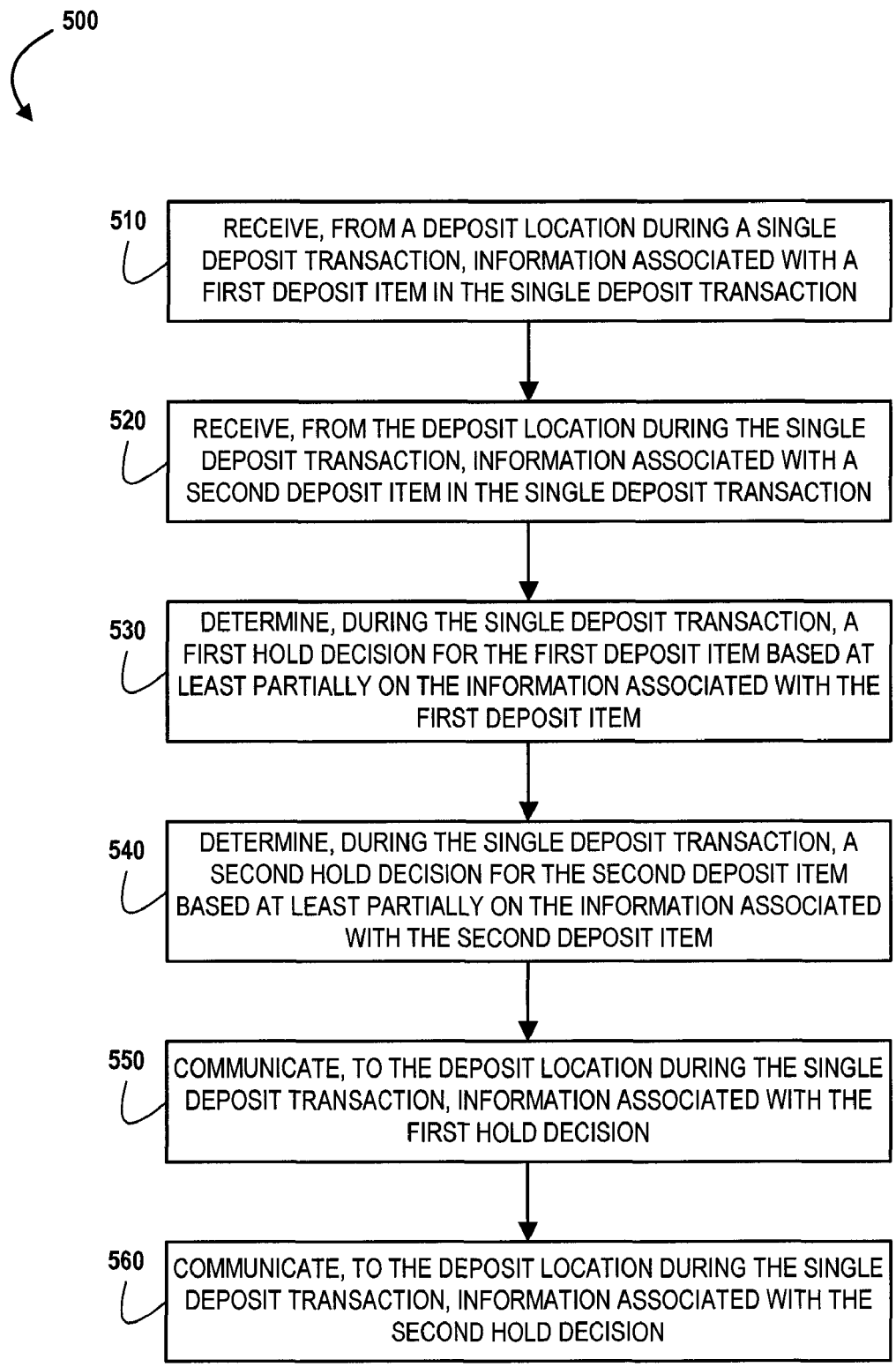
Figure 6:
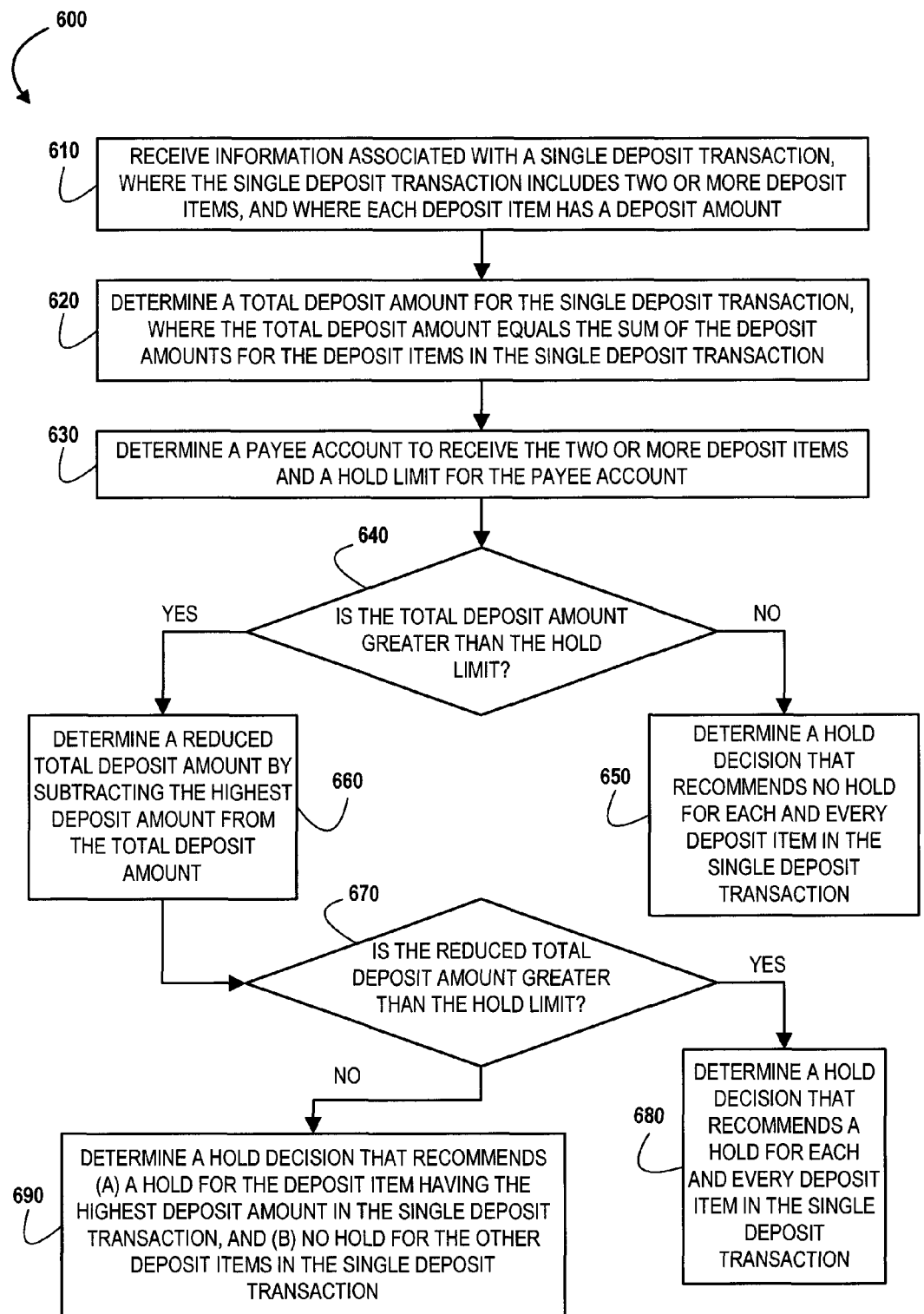
Figure 7:
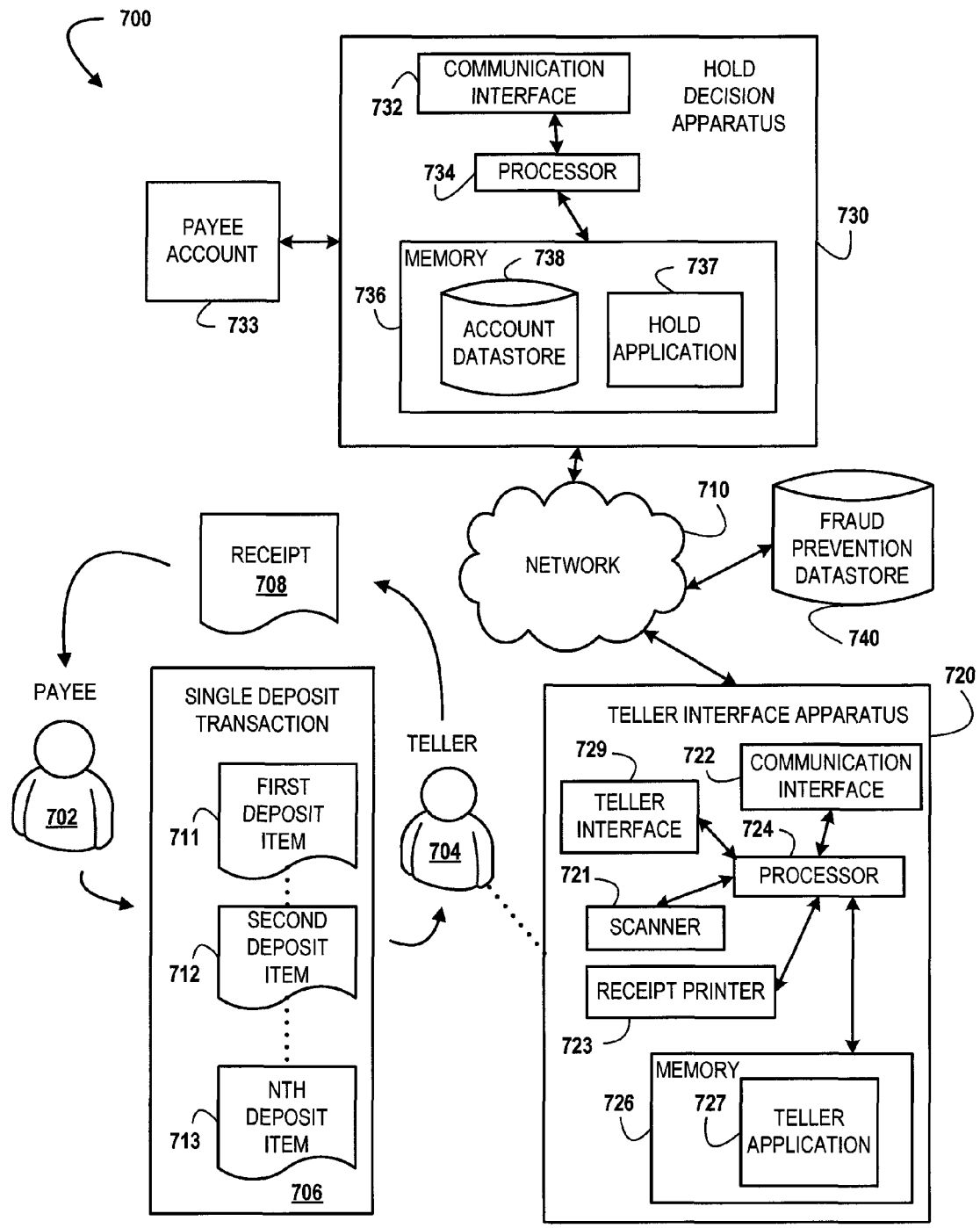
Figure 8:
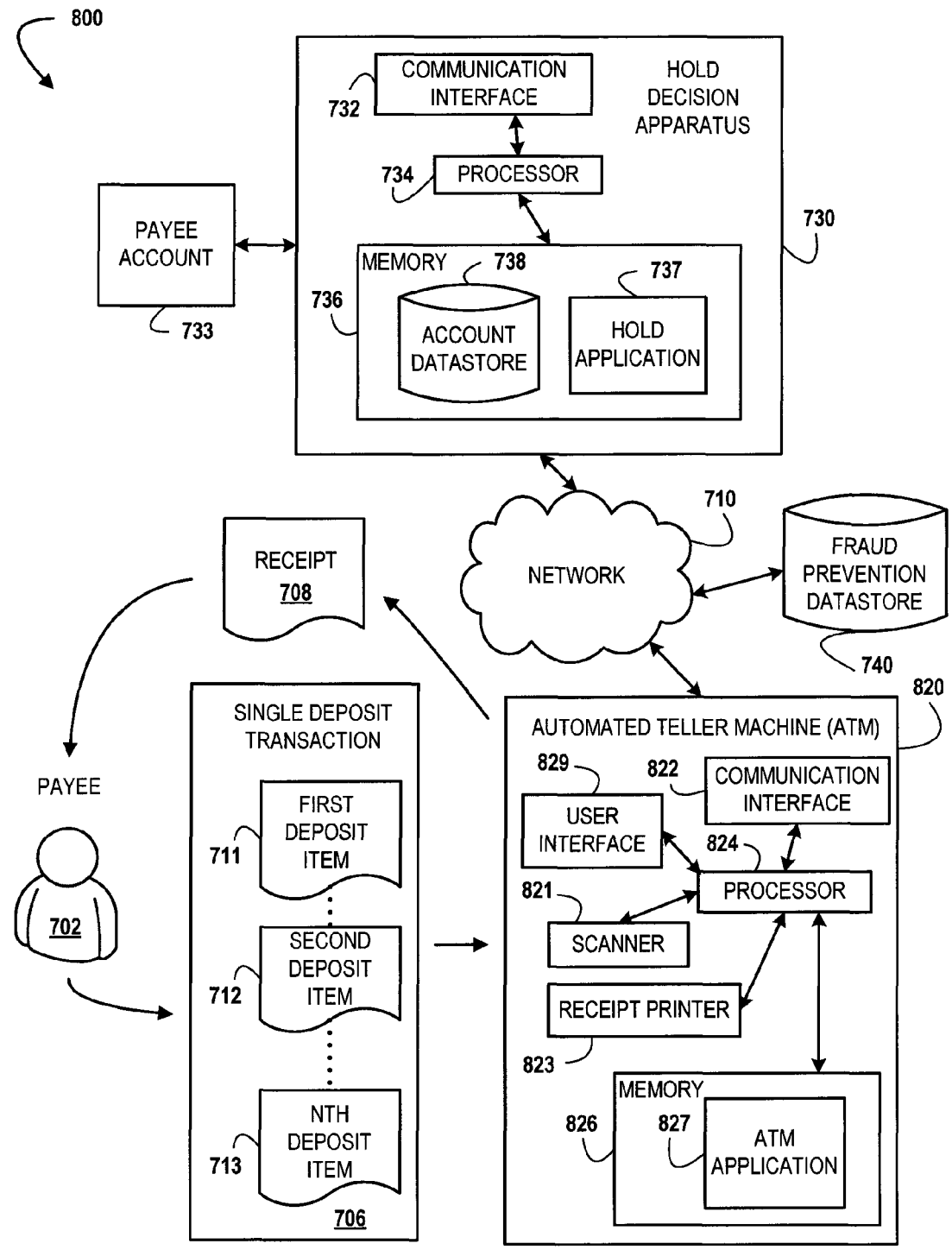
Figure 9:
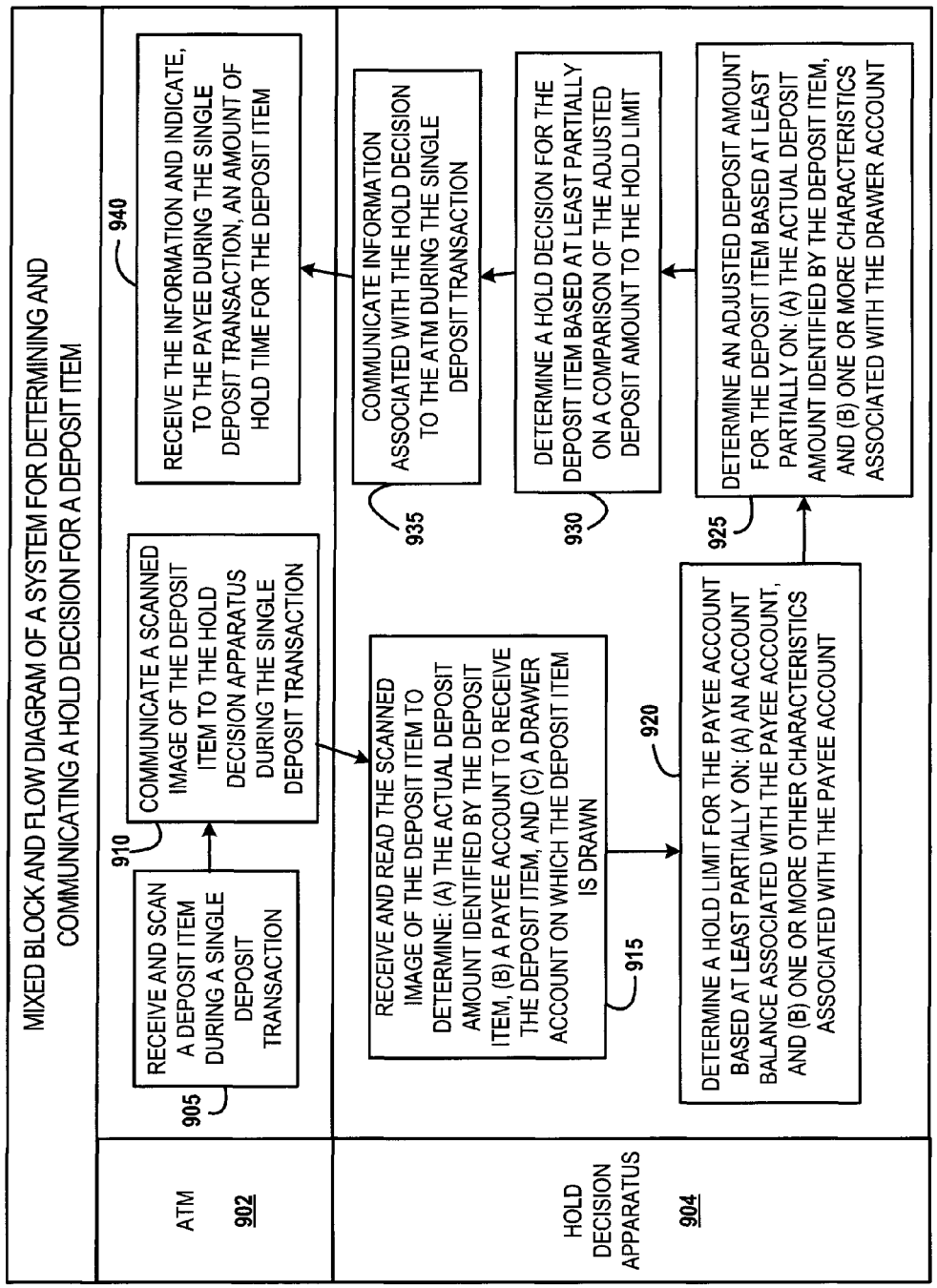

Having thus described some embodiments of the present invention in general terms, reference will now be made to the accompanying drawings, wherein:

FIG. 1 is a flow diagram illustrating a general process flow of an apparatus for determining, communicating, and/or executing a hold decision for a deposit item, in accordance with an embodiment of the present invention;

FIG. 2 is a flow diagram illustrating a general process flow of an apparatus for determining, communicating, and/or executing a hold decision for a deposit item based at least partially on a hold limit for a payee account, where the hold limit is based at least partially on (a) an account balance associated with the payee account, and (b) one or more other characteristics associated with the payee account, in accordance with an embodiment of the present invention;

FIG. 3 is a flow diagram illustrating a general process flow of an apparatus for determining, communicating, and/or executing a hold decision for a deposit item based at least partially on an adjusted deposit amount for the deposit item, where the adjusted deposit amount is based at least partially on (a) the actual deposit amount identified by the deposit item, and (b) one or more characteristics associated with a drawer account on which the deposit item is drawn, in accordance with an embodiment of the present invention;

FIG. 4 is a flow diagram illustrating a general process flow of an apparatus for determining, communicating, and/or executing a hold decision for a deposit item based at least partially on the hold limit described in connection with FIG. 2 and the adjusted deposit amount described in connection with the FIG. 3, in accordance with an embodiment of the present invention;

FIG. 5 is a flow diagram illustrating a general process flow of an apparatus for determining, communicating, and/or executing item-level hold decisions for deposit items in substantially real time, in accordance with an embodiment of the present invention;

FIG. 6 is a flow diagram illustrating a general process flow of an apparatus for determining, communicating, and/or executing item-level hold decisions for deposit items based at least partially on a reduced total deposit amount, in accordance with an embodiment of the present invention;

FIG. 7 is a block diagram illustrating technical components of a system for determining, communicating, and/or executing hold decisions for deposit items, in accordance with an embodiment of the present invention;

FIG. 8 is a block diagram illustrating technical components of a system for determining, communicating, and/or executing hold decisions for deposit items, in accordance with an embodiment of the present invention; and FIG. 9 is a mixed block and flow diagram of a system for determining, communicating, and/or executing a hold decision for a deposit item in substantially real time, in accordance with an embodiment of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and/or vice versa, unless explicitly stated otherwise. Also, as used herein, the term "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, an electronic, magnetic, optical, electromagnetic, infrared, and/or semiconductor apparatus. For example, in some embodiments, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of apparatuses and/or methods. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a computer-readable medium (e.g., a memory) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

Further, although many of the embodiments of the present invention described herein are generally described as involving a "financial institution," other embodiments of the present invention may involve one or more persons, organizations, businesses, and/or other entities that take the place of, or work in conjunction with, the financial institution to implement one or more of the embodiments described and/or contemplated herein as being performed by the financial institution.

It will be understood that the phrase "deposit item," as used herein, typically refers to a financial instrument that is drawn on a first financial account (the "drawer account") held by a first account holder (the "drawer") and paid to a second financial account (the "payee account") held by a second account holder (the "payee"). It will also be understood that a deposit item typically refers to one of one or more deposit items being deposited into a payee account at a deposit location (e.g., at an automated teller machine (ATM), at a teller interface apparatus in a banking center, at a personal computer, and/or at another location where a deposit can made) during a single deposit transaction. For example, FIG. 7 illustrates a first deposit item 711, a second deposit item 712, and on up to an nth deposit item 713. As shown, each of these deposit items are being deposited into the payee account 733 at the teller interface apparatus 720 during the single deposit transaction 706. For simplicity, it will be understood that a deposit item is often referred to herein as a "deposit item in a single deposit transaction."

In some embodiments of the present invention, the deposit item refers to a check, including, for example, a paper check, electronic check (i.e., e-check), personal check, business check, institutional check, cashier's check, money order, and/or the like. It will also be understood that, in accordance with some embodiments, the deposit item includes information associated with one or more of the following: the identity of the payee, the identity of the drawer, a routing number and/or account number associated with the drawer account, a deposit amount (e.g., the actual deposit amount identified by the deposit item, etc.), the signature of the drawer, a date, a deposit item identifier (e.g., a check number, etc.), and/or the like.

Further, it will be understood that the drawer account can be a deposit account, credit account, checking account, credit card account, savings account, money market account, investment account, line of credit (LOC) account, home equity line of credit (HELOC) account, and/or any other type of account on which a deposit item can be drawn. The payee account can be a deposit account, checking account, savings account, money market account, certificate of deposit account, money market account, investment account, and/or any other type of account into which a deposit item can be received. It will also be understood that the drawer account and/or the payee account may be held by one or more individuals, families, households, social networks, businesses (e.g., corporations, business units within corporations, small businesses, for profit, non-profit, etc.), and/or other entities. It will be further understood that, in some embodiments, the payee account and the drawer account are both maintained by the same financial institution, but in other embodiments, the payee account and the drawer account are maintained by different financial institutions and/or other entities.

In general terms, embodiments of the present invention relate to methods and apparatuses for determining, communicating, and/or executing hold decisions for deposit items. Generally speaking, when a payee deposits a deposit item into a payee account at a deposit location during a single deposit transaction, embodiments of the present invention are configured to determine a hold decision for that deposit item based at least partially on a comparison of a deposit amount for the deposit item to a hold limit for the payee account. In some embodiments, the hold limit is based at least partially on (a) an account balance associated with the payee account, and/or (b) one or more other characteristics associated with the payee account. Additionally or alternatively, in some embodiments, the deposit amount for the deposit item is based at least partially on (a) the actual deposit amount identified by the deposit item, and/or (b) one or more characteristics associated with the drawer account on which the deposit item is drawn. As such, embodiments of the present invention provide methods and apparatuses for more accurately assessing the true liability risks associated with deposit items, payee accounts, drawer accounts, payees, and/or drawers, which, in turn, can be used to substantially reduce the number of holds placed on deposit items that are not ultimately returned.

In addition, as described later herein, some embodiments of the present invention provide method and apparatuses that are configured to: (1) determine an individual hold decision for each of two or more deposit items in a single deposit transaction (for simplicity, sometimes referred to herein as determining one or more "item-level hold decisions"); and/or (2) determine each of those item-level hold decisions in substantially real-time, such that the depositor (e.g., the payee) receives the hold decisions at the deposit location at some point during the deposit transaction (e.g., before the payee leaves the deposit location, etc.).

Referring now to FIG. 1, a general process flow 100 of an apparatus for determining, communicating, and/or executing a hold decision is provided, in accordance with an embodiment of the present invention. More specifically, as represented by the block 110, the apparatus having the general process flow 100 is configured to receive information associated with a deposit item. As represented by the block 120, the apparatus is also configured to determine, based at least partially on the information associated with the deposit item, a deposit amount for the deposit item and a payee account to receive the deposit item. As represented by the block 130, the apparatus is further configured to determine a hold limit for the payee account, and as represented by the block 140, the apparatus is configured to compare the deposit amount for the deposit item to the hold limit for the payee account. Thereafter, as represented by the block 150, the apparatus is configured determine a hold decision for the deposit item based at least partially on a comparison of the deposit amount to the hold limit. In addition, in some embodiments, the apparatus is further configured to communicate information associated with the hold decision to a deposit location, as represented by the block 160.

Regarding the block 110, it will be understood that the apparatus having the process flow 100 can be configured to receive (e.g., retrieve, collect, obtain, acquire, receive, etc.) any amount and/or type of information associated with the deposit item. For example, in some embodiments, the information associated with deposit item includes the identity of the payee, information associated with the payee account (e.g., a routing number and/or account number, etc.), the identity of the drawer, information associated with the drawer account (e.g., a routing number and/or account number, etc.), the actual deposit amount for the deposit item (e.g., the deposit amount identified by the deposit item, etc.), the signature of the drawer, the date on which the deposit item was drawn, and/or any other information that makes it possible for the apparatus having the process flow 100 to perform the process flow 100.

It will also be understood that the information associated with the deposit item can be received at the apparatus having the process flow 100 in any form. For example, in some embodiments, the apparatus is configured to receive a scanned image of the deposit item (e.g., a scanned image of a paper check, etc.). In some of these embodiments, the apparatus is configured to read and/or otherwise obtain, from the scanned image of the deposit item, the information associated with the deposit item that is needed to determine a hold decision for the deposit item. As another example, in some embodiments, the apparatus having the process flow 100 is configured to receive the information associated with the deposit item in the form of digital information that has been processed into a computer-readable form in accordance with the needs of the apparatus having the process flow 100.

It will further be understood that the information associated with the deposit item can be received at the apparatus having the process flow 100 from any source. For example, in some embodiments, the apparatus is configured to receive the actual deposit item itself, such as, for example, where the deposit item is embodied as a paper check and where the apparatus having the process flow 100 is embodied as an ATM. In some of these embodiments, for example, the apparatus/ATM is configured to scan an image of the deposit item (e.g., a scanned image of a paper check) from which the information associated with the deposit item can be obtained.

Of course, in other embodiments, the actual deposit item is not received at the apparatus having the process flow 100, but instead, the apparatus is configured to receive the information associated with the deposit item from a source outside of the apparatus. For example, in some embodiments, the apparatus having the process flow 100 is configured to receive the information associated with the deposit item from (e.g., directly from, indirectly from, etc.) a deposit location. For example, in some embodiments, as described in more detail herein, the apparatus having the process flow 100 is embodied as the hold decision apparatus 730 illustrated in FIGS. 7 and 8. In such embodiments, the apparatus 730 is configured to receive, via the network 710, information associated with each of the deposit items 711, 712, and 713 from the teller interface apparatus 720 (FIG. 7) or from the ATM 820 (FIG. 8). Of course, it will be understood that there can be any number of apparatuses positioned between the deposit location and the apparatus having the process flow 100, some of which may be configured to process and/or communicate the information associated with the deposit item.

As another example of a deposit location, in some embodiments, the apparatus having the process flow 100 is configured to receive the information associated with the deposit item from a personal computer and/or other apparatus operated by the depositor (e.g., a payee). For example, in some embodiments, the depositor can make a deposit into a payee account over a network (e.g., the Internet, etc.) by, for example, scanning an image of the deposit item using a scanner and then directly or indirectly communicating that image, using a personal computer and/or the like, to the apparatus having the process flow 100.

Regarding the block 120, it will be understood that the apparatus having the process flow 100 can be configured to determine (e.g., read, discern, calculate, conclude, compute, determine, etc.) the deposit amount for the deposit item in any way. It will be understood that, in some embodiments, the deposit amount for the deposit item, as recited in the process flow 100, refers to the actual deposit amount identified by the deposit item. Accordingly, in some of these embodiments, the apparatus having the process flow 100 can be configured to determine the actual deposit amount by reading directly from the deposit item itself, from a scanned image of the deposit item, and/or from any other information associated with the deposit item that is received at the apparatus having the process flow 100. However, in other embodiments, the deposit amount for the deposit item includes an adjusted deposit amount, such as, for example, the adjusted deposit amount that is described in detail later herein in connection with FIG. 3. In some of these embodiments, the apparatus is configured to determine the adjusted deposit amount, or, in accordance with other embodiments, is configured to determine the adjusted deposit amount by receiving it from some other source.

Also regarding the block 120, it will be understood that the apparatus having the process flow 100 can be configured to determine the payee account to receive the deposit item in any way. For example, in some embodiments, the information associated with the deposit item includes information that identifies the payee account. In some embodiments, the apparatus having the process flow 100 is configured to determine the payee account based at least partially on information received from a deposit location, such as, for example, information associated with the identity of the payee account received when a magnetic card issued for the payee account is inserted into an ATM.

However, in other embodiments, the information associated with the deposit item does not identify the payee account, since, for example, many deposit items only identify the identity of the payee and not the identity of the payee account. In such embodiments, it will be understood that the apparatus having the process flow 100 is configured to determine the identity of the payee account in any way. For example, in some embodiments, the apparatus having the process flow 100 is configured to determine the payee account by comparing the payee name identified by the deposit item (and/or in the information associated with the deposit item) to a database of financial accounts.

Regarding the blocks 130-150, it will be understood that the phrase "hold limit," as used herein, typically refers to a threshold amount that is used to determine a hold decision for a deposit item. Specifically, the apparatus having the process flow 100 is configured to compare the deposit amount for the deposit item to the hold limit for the payee account, such that if the deposit amount is greater than the hold limit, then the apparatus is configured to determine a "negative" hold decision for the deposit item (e.g. one that recommends a hold for, and/or places a hold on, the deposit item, etc.). On the other hand, if the deposit amount associated with the deposit item is less than or equal to the hold limit for the payee account, then the apparatus having the process flow 100 is configured to determine a "positive" hold decision for the deposit item (e.g., one that does not recommend a hold for, and/or place a hold on, the deposit item, etc.). It will be understood that, in some embodiments, if the apparatus having the process flow 100 determines a "positive" hold decision for the deposit item, then funds equal to the actual deposit amount identified by the deposit item are made available (e.g., immediately, nearly immediately, or sometime after the hold decision, etc.) to the payee account and/or to the payee.

Regarding the block 130, it will also be understood that, in accordance with some embodiments, the hold limit for the payee account is based at least partially on: (a) an account balance associated with the payee account, and (b) one or more other characteristics associated with the payee account. For example, in some embodiments, the hold limit for the payee account is based at least partially on: (a) the available balance of the payee account at the time of the deposit transaction, and (b) the type of the payee account (e.g., personal, business, military, consumer, small business, institutional, checking, savings, money market, investment, etc.). In other embodiments of the present invention, however, the hold limit for the payee account referred to in the block 130 is not based on payee account-specific characteristics. For example, in some embodiments, apparatus having the process flow 100 is configured to determine a hold limit for the payee account that equals some set, predetermined amount (e.g., $100, $250, etc.).

Regarding the block 150, it will be understood that the hold decision for the deposit item can be embodied in any form. For example, in some embodiments, the apparatus having the process flow 100 is configured to determine a hold decision that includes, and/or is embodied as, a recommendation for placing a hold on the deposit item. As another example, in some embodiments, the hold decision includes, and/or is embodied as, actually placing a hold on the deposit item. As mentioned previously, it will be understood that hold decisions can include "positive" hold decisions (e.g., hold decisions associated with cashing a deposit item, paying a deposit item, not placing a hold on a deposit item, making deposit amount funds available, etc.) and "negative" hold decisions (e.g., hold decisions associated with returning a deposit item, placing a hold on a deposit item, not cashing a deposit item, not making deposit amount funds available, etc.).

Also regarding the block 150, it will be understood that the hold decision can include any amount and/or type of information. For example, in some embodiments, the hold decision includes information associated with whether the deposit item is being held and/or will be held, one or more reasons for why the deposit item is being held and/or will be held, an amount of hold time for the deposit item, whether funds have been and/or will be made immediately available to the payee account and/or to the payee, and/or the like.

Regarding the blocks 140-150, it will be understood that, in some embodiments, the apparatus having the process flow 100 is configured to compare the deposit amount for the deposit item to the hold limit for the payee account, and then determine a hold decision for the deposit item based on that comparison. However, in other embodiments, the apparatus having the process flow 100 is configured to determine the hold decision for the deposit item based at least partially on a comparison of the deposit amount for the deposit item to the hold limit for the payee account, but that comparison is not performed by the apparatus having the process flow 100.

Regarding the block 160, it will be understood that, in some embodiments, the apparatus having the process flow 100 is configured to communicate (e.g., transmit, send, transfer, route, communicate, etc.) information associated with the hold decision to a deposit location (i.e., to an ATM, to a teller interface apparatus in a banking center, to a personal computer, and/or to another location where a deposit can be made). In some embodiments, the deposit location referred to in the block 160 is the deposit location from which the information associated with the deposit item referred to in the block 110 was originally received. For example, in some embodiments, the apparatus having the process flow 100 is configured to receive the information associated with the deposit item from a deposit location, as represented by the block 110, then perform the steps represented by the blocks 120-150 in the process flow 100, and then communicate information associated with a hold decision for the deposit item back to the same deposit location, as represented by the block 160. In some of these embodiments, the apparatus is configured to perform each and every step in the process flow 100 in real time or substantially real time (collectively referred to herein as "substantially real time" for simplicity). In other words, in some embodiments, the apparatus having the process flow 100 is configured to perform the steps of the process flow 100 during the single deposit transaction involving the deposit item, such that, by the time the depositor (e.g., the payee) has completed the single deposit transaction, the depositor walks away from the deposit location knowing the information associated with the hold decision, such as, for example, whether a hold is being placed on the deposit item, an amount of hold time for the deposit item, etc.

Also regarding the block 160, it will be understood that the information associated with the hold decision can be displayed and/or otherwise presented to a teller at a teller interface apparatus (e.g., the teller interface apparatus 720 illustrated in FIG. 7), to a depositor (e.g., the payee) at an ATM (e.g., the ATM 820 illustrated in FIG. 8), and/or to another person and/or apparatus at another deposit location. In some embodiments, the information associated with the hold decision is presented to an interested party (e.g., a teller, a payee, etc.) by printing the information on a receipt (e.g., the receipt 708 printed by the receipt printer 723 of the teller interface apparatus 720 shown in FIG. 7, etc.). It will be understood that, in some embodiments, this receipt includes information associated with the hold decision, including, for example, whether a hold is being placed on the deposit item, an amount of hold time for the deposit item, etc.

Referring now to FIG. 2, a general process flow 200 is provided as an alternative embodiment to the general process flow 100 illustrated in FIG. 1. As shown in FIG. 2, an apparatus having the process flow 200 is configured to perform generally the same process flow as the process flow 100, except that, as represented by the block 230, the apparatus having the process flow 200 is configured to determine a hold limit for the payee account based at least partially on (a) an account balance associated with the payee account and (b) one or more other characteristics associated with the payee account. (It will be understood that the account balance associated with the payee account is a characteristic associated with the payee account, meaning that the hold limit determined and used in the process flow 200 is based at least partially on at least two different characteristics associated with the payee account (i.e., the account balance and at least one other payee account characteristic)). By determining and using a hold limit for the payee account that is based at least partially on: (a) an account balance associated with the payee account, and (b) one or more others characteristics associated with the payee account, it will be understood that the apparatus having the process flow 200 is able to more accurately assess, in advance of making a hold decision, the true liability risks presented by the payee account to the financial institution that maintains the payee account (e.g., the risk that (a) the deposit amount of a deposit item is made available to a payee account, (b) that deposit item is ultimately returned, and (c) the financial institution is ultimately unable to recover that amount from the payee and/or the payee account, etc.).

Regarding the block 230, it will be understood that the account balance associated with the payee account may include any number of account balances and/or type of account balance associated with the payee account. For example, in some embodiments, the account balance refers to the account balance of the payee account at the beginning of a statement period and/or other cycle. As another example, in some embodiments, the account balance refers to the average account balance of the payee account over a predetermined period of time (e.g., the past three statement periods, the past three days, since the payee account opened, etc.). As still another example, in some embodiments, the account balance associated with the payee account refers to the available account balance of the payee account (e.g., the amount of funds in the payee account available for withdrawal, etc.) at the time a deposit item (e.g., the deposit item referred to in the process flow 200, etc.) is deposited into the payee account. As a further example, in some embodiments, the account balance associated with the payee account refers to the account balance of the payee account at the beginning of day, middle of day, and/or end of day on the day a deposit item (e.g., the deposit item referred to in the process flow 200, etc.) is deposited into the payee account.

As another example, in some embodiments, the account balance associated with the payee account refers to the average daily account balance for the payee account during a predetermined period of time (e.g., during the last statement period, the past three days, the past week, the past month, the past year, etc.). In some embodiments, the account balance associated with the payee account refers to the lesser of: (a) the beginning of day account balance for the payee account on the day the deposit item is deposited into the payee account, and (b) the available account balance for the payee account at the time the deposit item is deposited into the payee account (i.e., Account Balance=Min (Beginning of Day Account Balance, Available Account Balance)).

Also regarding the block 230, it will be understood that the one or more other characteristics associated with the payee account may include any number of characteristics and/or type of characteristic associated with the payee account. In some embodiments, the one or more characteristics associated with the payee account include one or more characteristics associated with the payee. Exemplary characteristics associated with the payee include information associated with the payee's legal status (e.g., whether the payee is a person, a business, a non-profit organization, etc.), the payee's financial status (e.g., whether the payee is unable to meet payment obligations, has a high income, has a low financial trustworthiness number, has been associated with a proceeding in which a secured party has executed on collateral due to non-payment, has used one or more accounts, that have gone to loss due to funds not being available for a transaction, etc.), the payee's personal status (e.g., whether the payee is deceased, is subject ot confinement, is married, has a proven legal violation, has been associated with producing unauthorized monetary replicas, and/or other misrepresentations, etc.), and/or any other information associated with the payee.

In some embodiments, the one or more other characteristics associated with the payee account include one or more types of deposit transactions in which the payee account has been and/or is involved (e.g., the type of deposit transaction in which the deposit item referred to in the process flow 200 is deposited into the payee account, the type of deposit transaction in which some other deposit item is deposited into the payee account, etc.). Exemplary types of deposit transactions include "straight" deposits (e.g., where the entire deposit amount for the deposit item is being deposited into the payee account, etc.), "cashing" deposits (e.g., where the entire deposit amount for the deposit item is being deposited into, and being immediately withdrawn from, the payee account, etc.), "less cashing" deposits (e.g., where the entire deposit amount for the deposit item is being deposited into the payee account and part of that amount is being immediately withdrawn from the payee account, etc.), and/or the like.

It will be understood that the one or more other characteristics associated with the payee account can include "positive" characteristics (e.g., the payee account has a high available account balance, the payee account has never gone to loss due to funds not bein available for a transaction, the payee has a high financial trustworthiness number, etc.), can include "negative" characteristics (e.g., the payee account has gone to loss due funds not being available three times in the past twenty-four hours, the payee has a proven legal violation of counterfeiting, etc.), and/or can include "neutral" characteristics.

It will also be understood that, in some embodiments, the account balance associated with the payee account and/or the one or more other characteristics associated with the payee account are determined (i.e., by the apparatus having the process flow 200 and/or by another apparatus) based at least partially on account information associated with the payee account. For example, in some embodiments, the apparatus having the process flow 200 is configured to access information stored in an account database (e.g., the account datastore 738 of the hold decision apparatus 730, etc.) in order to determine the account balance associated with the payee account and/or the one or more other characteristics associated with the payee account.

Also, in some embodiments, the apparatus having the process flow 200 is configured to determine the account balance associated with the payee account and/or the one or more other characteristics associated with the payee account based at least partially on the transaction history associated with the payee account. As used herein, the phrase "transaction history" typically refers to any of the information associated with any one or more individual transactions in which the payee account has been involved, such as, for example, the description of the goods/services involved in the transaction, the transaction date, the posting date, the type of transaction (e.g., purchase, deposit (e.g., straight, cashing, less cashing, etc.), credit, debit, draw, etc.), the transaction amount, the names of the merchants or counterparties involved in the transaction, the locations of the merchants or counterparties involved in the transaction, and/or any other transaction information. It will be understood that the transaction history contemplated herein can include any of the information typically provided to the payee account holder (e.g., the payee) in a periodic (e.g., monthly) account statement and/or via an online and/or mobile banking account.

Provided below in Table 1 are examples of some payee account characteristics that can be used to determine a hold limit for the payee account:

TABLE 1

| List of Exemplary Characteristics Associated with a Payee Account | |
|---|---|
| EXEMPLARY CHARACTERISTICS ASSOCIATED WITH A PAYEE ACCOUNT | EXEMPLARY CHARACTERISTICS ASSOCIATED WITH A PAYEE ACCOUNT |
| NUMBER OF NON-SUFFICIENT FUNDS AND/OR OVERDRAFTS (NSF/OD) DURING A PREDETERMINED PERIOD OF TIME (E.G., DURING THE LAST STATEMENT PERIOD (OR CYCLE), IN THE PAST 3 DAYS, PAST MONTH, PAST 12 MONTHS, SINCE THE ACCOUNT OPENED, ETC.) | ACCOUNT TYPE (E.G., PERSONAL, CONSUMER, BUSINESS, SMALL BUSINESS, CORPORATE, INSTITUTIONAL, CHECKING, SAVINGS, MONEY MARKET, INVESTMENT, ETC.) |
| LIABILITY RISK SCORE (LRS) VALUE | ACCOUNT BALANCE (E.G., BEGINNING OF DAY, END OF DAY, AVAILABLE, AVERAGE DAILY BALANCE, ETC.) |
| ACCOUNT AGE (E.G., IN DAYS, WEEKS, MONTHS, ETC.) | TYPE OF DEPOSIT TRANSACTION INVOLVING THE PAYEE ACCOUNT |
| NUMBER OF CREDITS DURING A PREDETERMINED PERIOD OF TIME | NUMBER OF STOP PAYS DURING A PREDETERMINED PERIOD OF TIME |
| NUMBER OF NSF/OD DAYS DURING A PREDETERMINED PERIOD OF TIME | NUMBER OF DEBITS DURING A PREDETERMINED PERIOD OF TIME |
| AVERAGE NSF/OD AMOUNT DURING A PREDETERMINED PERIOD OF TIME | NUMBER OF ODP CREDITS DURING A PREDETERMINED PERIOD OF TIME |
| NUMBER AND/OR TYPE OF ITEMS IN A PORTFOLIO (E.G., BUSINESS PORTFOLIO, PERSONAL PORTFOLIO, ETC.) | DEPOSIT VELOCITY (E.G., NUMBER OF DEPOSITS MADE INTO AND/OR DEPOSIT TRANSACTIONS INVOLVING THE PAYEE ACCOUNT DURING A PREDETERMINED PERIOD OF TIME (E.G., ONE HOUR, TWO DAYS, SIX MONTHS, ETC.) |
| NUMBER OF DAYS, WEEKS, MONTHS, AND/OR YEARS THE ACCOUNT BALANCE HAS INCREASED DURING A PREDETERMINED PERIOD OF TIME | THE CHANGE (E.G., IN $, IN %, ETC.) IN THE ACCOUNT BALANCE OVER A PREDETERMINED PERIOD OF TIME |
| AVERAGE COLLECTED BALANCE LAST MONTH FOR ALL OPEN SDA/MMA SEGMENTS | THE NUMBER OF EXCEPTION DAYS DURING A PREDETERMINED PERIOD OF TIME |
| AMOUNT OF TIME SINCE LAST TRANSACTION (E.G., DEPOSIT TRANSACTION, PURCHASE, ETC.) | AMOUNT OF TIME SINCE THE LOWEST ACCOUNT BALANCE (E.G., EVER, FOR THE MONTH, FOR THE YEAR, ETC.) |
| RATIO OF CHANGE BETWEEN THE CURRENT ACCOUNT BALANCE AND A CYCLE MINIMUM ACCOUNT BALANCE | THE DEPOSIT AMOUNT OF THE FIRST DEPOSIT ITEM AND/OR TRANSACTION MADE INTO THE PAYEE ACCOUNT (INCLUDING AND/OR EXCLUDING THE PAYEE ACCOUNT) |

TABLE 1-continued

List of Exemplary Characteristics Associated with a Payee Account

| EXEMPLARY CHARACTERISTICS ASSOCIATED WITH A PAYEE ACCOUNT | EXEMPLARY CHARACTERISTICS ASSOCIATED WITH A PAYEE ACCOUNT |
|---|---|
| GROUPS OF STATE ENTITIES IN GEOGRAPHICAL REGION | AVERAGE AGE OF ALL OPEN ACCOUNTS HELD BY THE PAYEE AND/OR RELATED TO THE PAYEE ACCOUNT (INCLUDING AND/OR EXCLUDING THE PAYEE ACCOUNT) |
| AMOUNT OF TIME DOLLAR DEBITS ARE GREATER THAN DOLLAR CREDITS DURING A PREDETERMINED PERIOD OF TIME | NUMBER OF NSF/ODS DURING A PREDETERMINED PERIOD OF TIME FOR ALL OPEN ACCOUNTS HELD BY THE PAYEE AND/OR RELATED TO THE PAYEE ACCOUNT (INCLUDING AND/OR EXCLUDING THE PAYEE ACCOUNT) |
| NUMBER OF DEPOSIT TRANSACTIONS DURING A PREDETERMINED PERIOD OF TIME | TOTAL AMOUNT (E.G., IN $, ETC.) OF ALL NSF/ODS FOR ALL OPEN ACCOUNTS HELD BY THE PAYEE AND/OR RELATED TO THE PAYEE ACCOUNT (INCLUDING AND/OR EXCLUDING THE PAYEE ACCOUNT) |
| TOTAL AMOUNT (E.G., IN $, ETC.) OF ALL NSF/ODS FOR THE PAYEE ACCOUNT DURING A PREDETERMINED PERIOD OF TIME | NUMBER OF DAYS PAST DUE FOR INSTALLMENT LOANS HELD BY THE PAYEE AND/OR RELATED TO THE PAYEE ACCOUNT (INCLUDING AND/OR EXCLUDING THE PAYEE ACCOUNT) |
| NUMBER OF ACH'S DURING A PREDETERMINED PERIOD OF TIME | AGE OF THE NEWEST OPEN ACCOUNT HELD BY THE PAYEE |
| NUMBER OF ATM TRANSACTIONS AND/OR ATMS USED DURING A PREDETERMINED PERIOD OF TIME | NUMBER OF ACCOUNT HOLDERS FOR THE PAYEE ACCOUNT |
| MONTHS SINCE OLDEST CUSTOMER RELATIONSHIP WITH THE PAYEE | AGE OF THE OLDEST AND/OR YOUNGEST ACCOUNT HOLDER FOR THE PAYEE ACCOUNT |
| NUMBER OF ACTIVE CREDIT CARD SEGMENTS | MANAGED ACCOUNT INDICATOR |
| NUMBER OF ACTIVE ATM & CHECK CARD SEGMENTS | RATIO OF REVOLVING CREDIT BALANCES TO REVOLVING CREDIT LIMITS FOR ANY AND/OR ALL ACCOUNTS HELD BY THE PAYEE AND/OR RELATED TO THE PAYEE ACCOUNT (INCLUDING AND/OR EXCLUDING THE PAYEE ACCOUNT) |
| NUMBER OF ACTIVE DDA SEGMENTS | SUM OF DEPOSIT ACCOUNT BALANCES (INCLUDING AND/OR EXCLUDING THE PAYEE ACCOUNT) |
| NUMBER OF NSF/ODS DURING A PREDETERMINED PERIOD OF TIME FOR ALL DDA SEGMENTS | NUMBER OF VALID QUALIFIED ACCOUNT RECORDS ASSOCIATED WITH THE PAYEE AND/OR PAYEE ACCOUNT (INCLUDING AND/OR EXCLUDING THE PAYEE ACCOUNT) |
| NUMBER OF COMMERCIAL LOAN SEGMENTS | NUMBER OF ACTIVE SBA SEGMENTS |
| NUMBER OF ACTIVE LOAN SEGMENTS | SERVICE CHARGE CODE |
| NUMBER OF QUALIFYING CUSTOMER SEGMENTS | AMOUNT OF TIME UNTIL AN NSF/OD CURES |
| DEPOSIT AMOUNT FOR A DEPOSIT ITEM PREVIOUSLY DEPOSITED INTO THE PAYEE ACCOUNT (E.G., THE ACTUAL DEPOSIT AMOUNT IDENTIFIED BY THAT DEPOSIT ITEM, AN ADJUSTED DEPOSIT AMOUNT FOR THAT DEPOSIT ITEM, ETC.) | NUMBER OF PAPER DEPOSIT ITEMS DEPOSITED DURING A PREDETERMINED PERIOD OF TIME |
| AMOUNT OF TIME SINCE OLDEST DDA AND/OR SDA OPENED | NUMBER OF OPEN SDA & MMA SEGMENTS |
| TOTAL LIABILITY BALANCE (E.G., THE SUM OF THE ACCOUNT BALANCES FOR ALL OF THE DEPOSIT ACCOUNTS HELD BY THE PAYEE AND/OR ASSOCIATED WITH THE PAYEE ACCOUNT, INCLUDING OR EXCLUDING THE PAYEE ACCOUNT, ETC.) | NUMBER OF DIRECT DEPOSIT TRANSACTIONS DURING A PREDETERMINED PERIOD OF TIME |
| TOTAL DEBIT AMOUNT DURING A PREDETERMINED PERIOD OF TIME | TOTAL CREDIT AMOUNT DURING A PREDETERMINED PERIOD OF TIME |
| NUMBER OF PAPER CHECKS WRITTEN DURING A PREDETERMINED PERIOD OF TIME | AMOUNT OF TIME SINCE LAST NEGATIVE ACCOUNT BALANCE |
| AMOUNT OF TIME WITH NEGATIVE ACCOUNT BALANCE DURING A PREDETERMINED PERIOD OF TIME | AMOUNT OF TIME SINCE LAST RECORD CHANGE |
| AMOUNT OF CONSECUTIVE TIME WITH AT LEAST ONE NSF/OD | RATIO OF THE NUMBER OF CREDITS TO THE NUMBER OF DEBITS DURING A PREDETERMINED PERIOD OF TIME |
| RATIO OF NUMBER OF ATM WITHDRAWALS | NUMBER AND/OR AMOUNT OF RDIS |

TABLE 1-continued

List of Exemplary Characteristics Associated with a Payee Account

| EXEMPLARY CHARACTERISTICS ASSOCIATED WITH A PAYEE ACCOUNT | EXEMPLARY CHARACTERISTICS ASSOCIATED WITH A PAYEE ACCOUNT |
|---|---|
| DURING A PREDETERMINED PERIOD OF TIME TO TOTAL NUMBER OF ATM WITHDRAWALS OVER AN OVERLAPPING AND LONGER PREDETERMINED PERIOD OF TIME | DURING A PREDETERMINED PERIOD OF TIME |
| RATIO OF THE NUMBER OF PAPER DEBITS TO THE NUMBER OF TOTAL DEBITS DURING A PREDETERMINED PERIOD OF TIME | RATIO OF THE NUMBER OF PAPER AND ELECTRONIC DEBITS TO THE NUMBER OF TOTAL DEBITS DURING A PREDETERMINED PERIOD OF TIME |
| RATIO OF THE NUMBER OF DOLLAR CREDITS TO THE NUMBER OF DOLLAR DEBITS DURING A PREDETERMINED PERIOD OF TIME | RATIO OF CREDIT AMOUNT TO DEBIT AMOUNT DURING A PREDETERMINED PERIOD OF TIME |
| TOTAL NUMBER OF ACTIVE RELATIONSHIPS | WHETHER THE ACCOUNT HAS OVERDRAFT PROTECTION |
| NUMBER AND/OR AMOUNT OF OVERDRAFT PROTECTION TRANSFERS MADE DURING A PREDETERMINED PERIOD OF TIME | TOTAL NUMBER OF ACCOUNTS (INCLUDING AND/OR EXCLUDING THE PAYEE ACCOUNT) HELD BY THE PAYEE ACCOUNT AND/OR ASSOCIATED WITH THE PAYEE ACCOUNT THAT ARE PAST DUE |
| NUMBER AND/OR AMOUNT OF WITHDRAWALS DURING A PREDETERMINED PERIOD OF TIME | NUMBER AND/OR AMOUNT OF DEPOSIT ITEMS AND/OR DEPOSIT TRANSACTIONS DURING A PREDETERMINED PERIOD OF TIME |

It will be understood that, in some embodiments, the apparatus having the process flow 200 is configured to determine a hold limit for a payee account in accordance with Equation 1 shown below, which, as described below, is based at least partially on (a) an account balance associated with the payee account, and (b) one or more other characteristics associated with the payee account:

$$\text{Hold Limit} = \alpha_1 * \text{Initial Hold Limit} + \alpha_2 * \text{Account Balance}$$

Equation 1

Exemplary Equation for a Hold Limit for a Payee Account

As shown in Equation 1 above, the hold limit for a payee account equals the sum of two terms. The first term equals an initial hold limit associated with the payee account multiplied by a scalar $\alpha_1$. The second term equals an account balance associated with the payee account multiplied by a scalar $\alpha_2$. For example, if the scalar $\alpha_1$ is 2, the initial hold limit associated with the payee account is $2,000, the scalar $\alpha_2$ is 0.5, and the account balance associated with the payee account is $1,500, then the hold limit for the payee account would be $4,750 (i.e., 2*2000+0.5*1500→4000+750→4750).

In some embodiments, the initial hold limit associated with the payee account that is described in Equation 1 is based at least partially on a payee account characteristic called a liability risk score (LRS). It will be understood that, in such embodiments, the value of the LRS for the payee account indicates the liability risk presented by that payee account to the financial institution that maintains the payee account. For example, in some embodiments, the LRS value indicates the propensity of the payee account to go to loss (e.g., incur an NSF/OD, etc.) during a predetermined period of time (e.g., in the next three months, etc.). In some embodiments, a relatively low LRS value for the payee account indicates that the payee account presents a relatively high liability risk to the financial institution that maintains it. On the other hand, in such embodiments, a relatively high LRS value for the payee account indicates that the payee account presents a relatively low liability risk.

Provided below in Table 2 are examples of LRS values and corresponding initial hold limits for a payee account:

TABLE 2

List of Exemplary LRS Values and Corresponding Initial Hold Limits

| LIABILITY RISK SCORE (LRS) VALUE | INITIAL HOLD LIMIT (IN $) |
|---|---|
| <=470 | 100-500 |
| 471 TO 490 | 125-750 |
| 491 TO 520 | 150-1,200 |
| 521 TO 540 | 200-2,500 |
| 541 TO 570 | 250-3,500 |
| 571 TO 590 | 500-7,500 |
| 591 TO 620 | 800-12,000 |
| 621 TO 640 | 1,000-14,000 |
| 641 TO 660 | 2,000-16,000 |
| 661 TO 690 | 4,000-18,000 |
| 691 TO 710 | 5,000-22,000 |
| 711 TO 740 | 6,000-30,000 |
| >=741 | 7,000-50,000 |

In some embodiments, the LRN value for the payee account is itself based at least partially on one or more characteristics associated with the payee account, such as, for example, any one or more of the characteristics associated with the payee account described and/or contemplated herein, including those presented in Table 1 above. Specifically, in some embodiments, the LRN value for the payee account is based at least partially on at least one of: (a) a total liability balance associated with the payee account (e.g., the sum of the account balances for all of the deposit accounts held by the payee and/or associated with the payee account, including and/or excluding the payee account, etc.), and/or (b) a record associated with the payee indicating that the payee account has gone to loss due to funds not being available for a transaction (sometimes referred to herein as unavailable funds/account gone to loss or "UF/AGL") (e.g., the number of UF/AGLs the payee account has incurred during a predetermined period of time, etc.). As another example, in some embodiments, the LRN value for the payee account is based at least partially on the age of the payee account and/or the type of the payee account.

As a specific example, using Tables 1 and 2 above, if a payee account is a consumer account, is less than 10 days old, has an available account balance of $25, and has had four UF/AGLs in the past two days, then the apparatus having the process flow 200 may be configured to determine a relatively low LRN value of 450 for the payee account and a corresponding relatively low initial hold limit of $100. Accordingly, in this example, the apparatus would determine a "negative" hold decision (e.g., recommend a hold for, and/or place a hold on, etc.) for any deposit item being deposited into the payee account that has a deposit amount greater than $100. In contrast, as another specific example, using Tables 1 and 2, if a payee account is a business account, is over thirty years old, has an available account balance of $2,000,000 (i.e., $2.0M), and has never had an UF/AGL, then the apparatus having the process flow 200 may be configured to determine a relatively high LRN value of 700 for the payee account and a corresponding relatively high initial hold limit of $10,000. Accordingly, in this example, the apparatus would determine a "negative" hold decision (e.g., recommend a hold for, and/or place a hold on, etc.) for any deposit item being deposited into the payee account that has a deposit amount greater than $10,000. Based on the previous two examples, it will be understood that a payee account having "positive" account characteristics is typically assigned a relatively higher LRN value and relatively higher initial hold limit than a payee account having "negative" account characteristics.

It will also be understood that, in some embodiments, the values of the scalars $\alpha_1$ and $\alpha_2$ described in Equation 1 are based at least partially on one or more characteristics associated with the payee account, such as, for example, any one or more of the characteristics associated with the payee account that are described and/or contemplated herein, including those presented in Tables 1 and 2 above. In some embodiments, the values of the scalars $\alpha_1$ and $\alpha_2$ are based at least partially on: (a) the type of the deposit transaction in which the deposit item referred to in the process flow 200 is deposited into the payee account; (b) the actual deposit amount identified by the deposit item; (c) the deposit velocity associated with the payee account (e.g., the number of deposit items made into and/or deposit transactions involving the payee account during a predetermined period of time (e.g., one hour, two days, six months, etc.)); (d) the type of the payee account; and/or (e) the age of the payee account.

Provided below in Table 3 are examples of some combinations of payee account characteristics and corresponding values for the scalars $\alpha_1$ and $\alpha_2$:

TABLE 3

List of Exemplary Characteristics Associated with a Payee Account and Corresponding Alpha 1 ($\alpha_1$) and Alpha 2 ($\alpha_2$) Values

| DEPOSIT TRANS. TYPE | ACTUAL DEPOSIT AMOUNT (IN $) | DEPOSIT VELOCITY | ACCOUNT TYPE | ACCOUNT AGE (IN DAYS) | ALPHA 1 | ALPHA 2 |
|---|---|---|---|---|---|---|
| ANY | ANY | 9 OR MORE DEPOSIT TRANSACTIONS IN PAST 2 DAYS | ANY | <5 | 0-1 | 0.1-2 |
| ANY | ANY | 9 OR MORE DEPOSIT TRANSACTIONS IN PAST 2 DAYS | ANY | >=5 | 0-2 | 0.1-2 |
| ANY | ANY | 6 OR MORE DEPOSIT TRANSACTIONS TODAY | ANY | ANY | 0-2 | 1-5 |
| ANY | ANY | 9 OR MORE DEPOSIT TRANSACTIONS IN PAST 5 DAYS | ANY | <5 | 0-0.8 | 1-10 |
| ANY | ANY | 9 OR MORE DEPOSIT TRANSACTIONS IN PAST 5 DAYS | ANY | >=5 | 0.5-1.5 | 1-5 |
| ANY | ANY | ANY | ANY | <5 | 0-1 | 5-10 |
| ANY | ANY | ANY | ANY | >=5 AND <90 | 1-5 | 5-10 |
| ANY | ANY | ANY | ANY | >=90 | 1-5 | 5-30 |
| STRAIGHT | ANY | ANY | BUSINESS | >=5 AND <90 | 0-1 | 5-30 |
| STRAIGHT | ANY | ANY | BUSINESS | >=90 | 1-5 | 5-20 |
| STRAIGHT | ANY | ANY | CONSUMER | >=5 AND <90 | 1-5 | 5-10 |
| STRAIGHT | >900 | ANY | CONSUMER | >=90 | 1-5 | 5-50 |
| STRAIGHT | <=900 | ANY | CONSUMER | >=90 | 1-7 | 5-40 |
| LESS CASHING | ANY | ANY | BUSINESS | >=5 AND <90 | 1-5 | 5-10 |
| LESS CASHING | ANY | ANY | BUSINESS | >=90 | 1-8 | 0-1 |
| LESS CASHING | ANY | ANY | CONSUMER | >=5 AND <90 | 1-10 | 1-5 |
| LESS CASHING | >3000 | ANY | CONSUMER | >=90 | 1-10 | 1-5 |
| LESS CASHING | <=3000 | ANY | CONSUMER | >=90 | 1-5 | 1-5 |
| CASHING | ANY | ANY | BUSINESS | >=5 AND <90 | 0-1 | 1-5 |
| CASHING | ANY | ANY | BUSINESS | >=90 | 1-5 | 1-5 |
| CASHING | ANY | ANY | CONSUMER | >=5 AND <90 | 1-5 | 5-10 |
| CASHING | >1.5M | ANY | CONSUMER | >=90 | 0-1 | 3-20 |
| CASHING | <=1.5M | ANY | CONSUMER | >=90 | 1-5 | 5-15 |

As a specific example, according to Table 3, if the type of the deposit transaction in which the deposit item is deposited into the payee account is a straight deposit, the actual deposit amount identified by the deposit item is $40, the number of deposit transactions involving the payee account in the past two days is 10, the type of the payee account is a consumer account, and the age of the payee account is 3 days, then the apparatus having the process flow 200 may be configured to determine corresponding values of 0 for the scalar $\alpha_1$ and 0.7 for the scalar $\alpha_2$. Accordingly, in this example, the apparatus is configured to determine a hold limit for the payee account that essentially ignores the value of the initial hold limit associated with the payee account, perhaps because, for example, the account is only 3 days old and does not have much transaction history. Also, in this example, the apparatus is configured to discount the account balance in calculating the hold limit, perhaps because, for example, the account is a consumer account and has a relatively high deposit velocity. As such, it will be understood that the value of the scalar $\alpha_1$ determines the influence of the initial deposit limit term on the hold limit for the payee account, and that the value of the scalar $\alpha_2$ determines the influence of the account balance term on the hold limit for the payee account.

It will be understood that the values of the scalar $\alpha_1$ and/or the scalar $\alpha_2$ may be set and/or adjusted as necessary to properly assess the liability risks presented by the payee account to the financial institution that maintains it. It will also be understood that, in some embodiments, the scalar $\alpha_1$ and/or the scalar $\alpha_2$ can be assigned a default value (e.g., 1, etc.) where, for example, the payee account has no match in Table 3, etc. Also, in some embodiments of the present invention, the values of the scalar $\alpha_1$ and the scalar $\alpha_2$ can be different from those in Table 3, and/or can be determined based at least partially on one or more other characteristics, and/or combinations of characteristics, associated with the payee account.

Further, it will be understood that, in some embodiments of the present invention, the hold limit for the payee account may be different from that described by Equation 1. For example, in some embodiments, the apparatus having the process flow 200 is configured to determine a hold limit for the payee account based at least partially on either the first term described by Equation 1 (e.g., Hold Limit=$\alpha_1$*Initial Hold Limit, etc.), or the second term described by Equation 1 (e.g., Hold Limit=$\alpha_2$*Account Balance, etc.), but not both. As another example, in other embodiments, the apparatus having the process flow 200 is configured to determine a hold limit for the payee account based at least partially on: (a) an account balance associated with the payee account, and (b) one or more other characteristics associated with the payee account, but the hold limit is not based on any of the terms described by Equation 1.

Referring now to FIG. 3, a general process flow 300 is provided as another alternative embodiment to the general process flow 100 illustrated in FIG. 1. As shown in FIG. 3, an apparatus having the process flow 300 is configured to perform generally the same process flow as the process flow 100, except that, as represented by the blocks 320, 320A, 340, and 350, the apparatus having the process flow 300 is configured to determine a hold decision for the deposit item based at least partially on an adjusted deposit amount for the deposit item, where the adjusted deposit amount is based at least partially on (a) the actual deposit amount identified by the deposit item, and (b) one or more characteristics associated with a drawer account on which the deposit item is drawn. By determining and using an adjusted deposit amount for the deposit item that is based at least partially on one or more characteristics associated with the drawer account, it will be understood that the apparatus having the process flow 300 is able to more accurately assess, in advance of making a hold decision, the liability risks presented by the deposit item and/or the drawer account to the financial institution that maintains the payee account (e.g., the risk that (a) the deposit amount of a deposit item is made available to a payee account, (b) that deposit item is ultimately returned, and (c) the financial institution is ultimately unable to recover that amount from the drawer account, the drawer, the payee, and/or the payee account, etc.).

As an example, in some embodiments, the apparatus having the process flow 300 is configured to determine an adjusted deposit amount for a deposit item in accordance with Equation 2 provided below:

Adjusted Deposit Amount=$\alpha_3$*Actual Deposit Amount

Equation 2

Exemplary Equation for an Adjusted Deposit Amount for a Deposit Item

As shown in Equation 2 above, the adjusted deposit amount for a deposit item equals the product of the actual deposit amount identified by the deposit item multiplied by a scalar $\alpha_3$, where the value of the scalar $\alpha_3$ is based at least partially on one or more characteristics associated with the drawer account. Thus, it will be understood that the value of the scalar $\alpha_3$ determines whether the adjusted deposit amount is greater than, equal to, or less than the actual deposit amount identified by the deposit item. As such, the value of the scalar $\alpha_3$ can be used to set and/or adjust the influence of the actual deposit amount in determining the hold decision for the deposit item. For example, suppose the deposit item referred to in the process flow 300 has an actual deposit amount of $60, and the payee account referred to therein has a hold limit of $200. Given these exemplary parameters, if the apparatus having the process flow 300 determines, based at least partially on one or more characteristics associated with the drawer account, that the deposit item is relatively risky because, for example, the drawer account is relatively new (e.g., less than 30 days old, etc.), then the apparatus may be configured to determine a value of 5 for the scalar $\alpha_3$. This decision means that instead of the $60 actual deposit amount being compared to the $200 hold limit, it is the adjusted deposit amount of $300 that is compared to the $200 hold limit. As such, it will be understood that the value of the scalar $\alpha_3$ is often the determining factor for the apparatus having the process flow 300 in determining the hold decision for the deposit item.

In some embodiments, the one or more characteristics associated with the drawer account include at least one of: (a) the age of the drawer account, and/or (b) the type of the drawer account (e.g., consumer, business, personal, military, small business, institutional, checking, savings, investment, forced to present, HELOC, credit card, LOC, etc.). Alternatively or additionally, in some embodiments, the one or more characteristics associated with the drawer account include at least one of: (a) a non-sufficient funds/overdraft record associated with the drawer account, (b) an uncollected funds (UCF) record associated with the drawer account, (c) a dormant/inactive status associated with the drawer account, (d) a counterfeiting record associated with the drawer account, (e) an account not located status associated with the drawer account, and/or (f) a lost/stolen status associated with the drawer account.

Provided below in Table 4 are examples of some combinations of drawer account characteristics and corresponding values for the scalar $\alpha_3$:

TABLE 4

List of Exemplary Characteristics Associated with a
Drawer Account and Corresponding Alpha 3 ($\alpha_3$) Values

| DRAWER ACCOUNT CHARACTERISTIC | ACCOUNT AGE (IN DAYS) | ACCOUNT TYPE | ALPHA 3 |
|---|---|---|---|
| NSF/OD | >=90 | CONSUMER | 2,000-10,000 |
| NSF/OD | >=90 | BUSINESS | 3,000-9,000 |
| NSF/OD | <90 | CONSUMER | 1,000-20,000 |
| NSF/OD | <90 | BUSINESS | 500-20,000 |
| NSF/OD - NEW (E.G., THE NSF/OD IS RELATIVELY RECENT, ETC.) | >=90 | CONSUMER | 50,000-200,000 |
| NSF/OD - NEW | >=90 | BUSINESS | 30,000-90,000 |
| NSF/OD - NEW | <90 | CONSUMER | 200,000-400,000 |
| NSF/OD - NEW | <90 | BUSINESS | 40,000-100,000 |
| UCF | >=90 | CONSUMER | 50-250 |
| UCF | >=90 | BUSINESS | 275-450 |
| UCF | <90 | CONSUMER | 800-1,200 |
| UCF | <90 | BUSINESS | 500-1,000 |
| UCF - NEW | >=90 | CONSUMER | 5,000-8,500 |
| UCF - NEW | >=90 | BUSINESS | 30,000-65,000 |
| UCF - NEW | <90 | CONSUMER | >400,000 |
| UCF - NEW | <90 | BUSINESS | 50,000-100,000 |
| DORMANT/INACTIVE | >=90 | CONSUMER | 50-200 |
| DORMANT/INACTIVE | >=90 | BUSINESS | 25-80 |
| DORMANT/INACTIVE | <90 | CONSUMER | >500,000 |
| DORMANT/INACTIVE | <90 | BUSINESS | 500-1,500 |
| HOLDER DECEASED | ANY | ANY | 30-300 |
| LOST/STOLEN | ANY | ANY | 3,000-6,000 |
| ATTACHED | >=90 | CONSUMER | 100-300 |
| ATTACHED | >=90 | BUSINESS | 10-50 |
| ATTACHED | <90 | CONSUMER | 20-70 |
| ATTACHED | <90 | BUSINESS | 10,000-14,000 |
| DIVESTED ACCOUNT | ANY | ANY | 5,000-8,000 |
| NEW ACCOUNT | >=90 | CONSUMER | 1-2,000 |
| NEW ACCOUNT | >=90 | BUSINESS | 1-550 |
| NEW ACCOUNT | <90 | CONSUMER | 1-4,000 |
| NEW ACCOUNT | <90 | BUSINESS | 1-1,500 |
| STOP 3 FIELD AMT. SINGLE | ANY | ANY | 1-5 |
| ACCOUNT CLOSED | ANY | ANY | 8,000-20,000 |
| ACCOUNT NOT LOCATED | ANY | ANY | 100-300 |
| MULTIPLE MATCHING ACCOUNTS | ANY | ANY | 7,500-18,000 |
| NO SERIAL MATCH | ANY | ANY | 75-325 |
| COUNTERFEITING | ANY | ANY | >500,000 |
| FORCED TO PRESENT ACCOUNT | ANY | ANY | 0.1-1 |
| CREDIT CARD ACCOUNT | ANY | ANY | 6,000-8,500 |
| LINE OF CREDIT (LOC) ACCOUNT | ANY | ANY | 100-250 |
| HELOC ACCOUNT | ANY | ANY | 5-30 |

As a specific example, according to Table 4, if the drawer account has a record of producing unauthorized monetary replicas (e.g., the drawer account is held and/or maintained by a known and/or alleged producer of unauthorized monetary replicas, the drawer account has been used to draft checks, that are unauthorized check replicas, the drawer account itself has been found to be an authorized drawer account, etc.), then the corresponding value for the scalar $\alpha_3$ is greater than 500,000 (e.g., 500,000, 650,000, 999,999, etc.). As such, the adjusted deposit amount will be at least 500,000 times greater than the actual deposit amount identified by the deposit item, thereby indicating that the deposit item presents an extremely high liability risk to the payee financial institution and, depending on the hold limit for the payee account, probably should be held. In contrast, as another example, if the drawer account includes a "forced to present" account (e.g., the drawer account is a payroll account that is used to draft relatively low risk payroll checks, etc.), then, according to Table 4, the corresponding value for the scalar $\alpha_3$ is somewhere in the range of 0.1 to 1 (e.g., 0.1, 0.5, 1.0, etc.). In such a case, the adjusted deposit amount will be less than or equal to the actual deposit amount identified by the deposit item, thereby indicating that the deposit item presents a relatively low liability risk to the payee financial institution and, depending on the hold limit for the payee account, probably should not be held.

It will be understood that the values of the scalar $\alpha_3$ may be set and/or adjusted as necessary to properly assess the liability risks presented by the drawer account to the financial institution that maintains the payee account. It will also be understood that, in some embodiments, the scalar $\alpha_3$ can be assigned a default value (e.g., 1, etc.) where, for example, the drawer account has no match in Table 4, etc. Also, in some embodiments of the present invention, the values of the scalar $\alpha_3$ can be different from those in Table 4, and/or can be determined based at least partially on one or more other characteristics, and/or combinations of characteristics, associated with the drawer account.

It will also be understood that, in some embodiments, the one or more characteristics associated with the drawer account include one or more characteristics associated with the drawer. Exemplary characteristics associated with the drawer include whether the drawer is deceased, is unable to meet payment obligations, has any proven legal violations, has been associated with producing unauthorized monetary replicas, has been associated with a proceeding in which a secured party executed on collateral due to non-payment, has a relatively low financial trustworthiness number, is a person or an organization, has a high income, and/or the like. Similarly, it will also be understood that, in some embodiments, the one or more characteristics associated with the drawer account include one or more characteristics associated with the deposit item. Exemplary characteristics associated with the deposit item include whether the deposit item is authentic, is misleading, is missing information (e.g., date, signature field, account number, etc.), was drafted more than six months ago, and/or the like.

Also, it will be understood that the one or more characteristics associated with the drawer account can include "positive" characteristics (e.g., the drawer account has a high available account balance, the drawer account has never gone to loss due to funds not being available for a transaction, the drawer has a high financial trustworthiness number, etc.), can include "negative" characteristics (e.g., the drawer account has been closed, the drawer is deceased, the drawer has a proven legal violation of producing unauthorized monetary replicas,, etc.), and/or can include "neutral" characteristics.

It will be further understood that, in some embodiments, the apparatus having the process flow 300 is configured to determine the one or more characteristics associated with the drawer account by obtaining information identifying the drawer account from the deposit item (e.g., routing and/or account number, information obtained by performing magnetic ink character recognition (MICR), etc.), and then accessing information associated with the drawer account that is stored in an account database (e.g., the account datastore 738 of the hold decision apparatus 730, etc.). In some embodiments, the apparatus having the process flow 300 is configured to determine the one or more other characteristics associated with the drawer account based at least partially on the transaction history associated with the drawer account. Still further, in some embodiments, the apparatus having the process flow 300 is configured to receive information associated with the one or more characteristics associated with the drawer account from an outside.

Also, it will also be understood that, in some embodiments, the adjusted deposit amount for the deposit item may be different from that described by Equation 2. For example, in some embodiments, the adjusted deposit amount refers to the greater of: (a) the actual deposit amount identified by the deposit item, and (b) the adjusted deposit amount described in Equation 2 (i.e., the adjusted deposit amount=Max (Actual Deposit Amount, Equation 2 Adjusted Deposit Amount)). As another example, in some embodiments, the apparatus having the process flow 300 is configured to determine the adjusted deposit amount for the deposit item based at least partially on: (a) the actual deposit amount identified by the deposit item, and (b) one or more characteristics associated with the drawer account, but the adjusted deposit amount is not based on Equation 2.

Referring now to FIG. 4, a general process flow 400 of an apparatus for determining, communicating, and/or executing a hold decision for a deposit item is provided in accordance with an embodiment of the present invention. It will be understood that process flow 400 combines the hold limit and adjusted deposit amount features of the process flows 200 and 300 previously described herein. As such, it will be understood that the apparatus having the process flow 400 is able to more accurately assess, in advance of making a hold decision, the liability risks presented by the drawer account, drawer, payee account, and payee to the financial institution that maintains the payee account.

Referring specifically now to FIG. 4, as represented by the block 110 shown in FIG. 4, the apparatus having the process flow 400 is configured to receive information associated with a deposit item. As represented by the block 320 shown in FIG. 4, the apparatus is also configured to determine, based at least partially on the information associated with the deposit item, an actual deposit amount identified by the deposit item, a payee account to receive the deposit item, and a drawer account on which the deposit item is drawn. As represented by the block 320A shown in FIG. 4, the apparatus having the process flow 400 is further configured to determine an adjusted deposit amount for the deposit item based at least partially on (a) the actual deposit amount identified by the deposit item, and (b) one or more characteristics associated with the drawer account. As represented by the block 230 shown in FIG. 4, the apparatus is also configured to determine a hold limit for the payee account based at least partially on (a) an account balance associated with the payee account, and (b) one or more other characteristics associated with the payee account. As represented by the block 340 shown in FIG. 4, the apparatus is configured to compare the adjusted deposit amount to the hold limit. As represented by the block 350 shown in FIG. 4, the apparatus is further configured to determine a hold decision for the deposit item based at least partially on a comparison of the adjusted deposit amount to the hold limit. Also, as represented by the block 160 shown in FIG. 4, the apparatus having the process flow 400 is configured communicate information associated with the hold decision to a deposit location.

Referring now to FIG. 5, it will be understood that an apparatus having any of the process flows described and/or contemplated herein can be used to determine, communicate, and/or execute one or more deposit item-level hold decisions for one or more deposit items in a single deposit transaction. Further, such an apparatus can also be configured to determine, communicate, and/or execute these deposit item-level hold decisions in substantially real time during the single deposit transaction. These features are very useful to the payee (and/or other depositor) because, by receiving, in substantially real-time, a hold decision for each deposit item in a single deposit transaction, the payee is less likely to later unintentionally incur an UF/AGL due to the deposit amount funds from the deposit transaction not being available.

Referring specifically now to FIG. 5, as represented by the block 510, an apparatus having the process flow 500 is configured to receive, from a deposit location during a single deposit transaction, information associated with a first deposit item in the single deposit transaction. As represented by the block 520, the apparatus is also configured to receive, from the deposit location during the single deposit transaction, information associated with a second deposit item in the single deposit transaction. As represented by the block 530, the apparatus is further configured to determine, during the single deposit transaction, a first hold decision for the first deposit item based at least partially on the information associated with the first deposit item. As represented by the block 540, the apparatus is also configured to determine, during the single deposit transaction, a second hold decision for the second deposit item based at least partially on the information associated with the second deposit item. As represented by the block 550, the apparatus is also configured to communicate, to the deposit location during the single deposit transaction, information associated with the first hold decision. And, as represented by the block 560, the apparatus having the process flow 500 is further configured to communicate, to the deposit location during the single deposit transaction, information associated with the second hold decision.

As a specific example, referring to FIGS. 5 and 7, in some embodiments of the present invention, the apparatus having the process flow 500 is embodied as the hold decision apparatus 730 shown in FIG. 7. (It will be understood, however, that in some embodiments, the apparatus having the process flow 500 is embodied as the teller interface apparatus 720 shown in FIG. 7 and/or as the automated teller machine (ATM) 820 shown in FIG. 8.) In such embodiments, the hold decision apparatus 730 is configured to: (a) receive, using the communication interface 732, from the teller interface apparatus 720, during the single deposit transaction 706, information associated with the first deposit item 711 in the single deposit transaction 706, as represented by the block 510; (b) receive, using the communication interface 732, from the teller interface apparatus 720, during the single deposit transaction 706, information associated with the second deposit item 712 in the single deposit transaction 706, as represented by the block 520; (c) determine, using the processor 734, during the single deposit transaction 706, a first hold decision for the first deposit item 711 based at least partially on the information associated with the first deposit item 711, as represented by the block 530; (d) determine, using the processor 734, during the single deposit transaction 706, a second hold decision for the second deposit item 712 based at least partially on the information associated with the second deposit item 712, as represented by the block 540; (e) communicate, using the communication interface 732, to the teller interface apparatus 720, during the single deposit transaction 706, information associated with the first hold decision, as represented by the block 550; (f) communicate, using the communication interface 732, to the teller interface apparatus 720, during the single deposit transaction 706, information associated with the second hold decision, as represented by the block 560.

Referring now to FIG. 6, a general process flow 600 of an apparatus for determining, communicating, and/or executing one or more deposit item-level hold decisions is provided, in accordance with an embodiment of the present invention. It will be understood that the apparatus having the process flow 600 can also be configured to determine one or more deposit item-level hold decisions in substantially real time. As such, it will be understood that an apparatus having the process flow 500 shown in FIG. 5 can be configured to determine the hold decisions for the first deposit item and second deposit item referred to therein in accordance with the process flow 600 shown in FIG. 6 and/or described herein.

As shown in FIG. 6, as represented by the block 610, the apparatus having the process flow 600 is configured to receive information associated with a single deposit transaction, where the single deposit transaction includes two or more deposit items, and where each deposit item has a deposit amount (e.g., an actual deposit amount, an adjusted deposit amount in accordance with Equation 2 and/or Table 4 herein, etc.). As represented by the block 620, the apparatus is also configured to determine a total deposit amount for the single deposit transaction, where the total deposit amount equals the sum of the deposit amounts for the deposit items in the single deposit transaction. As represented by the block 630, the apparatus is further configured to determine a payee account to receive the two or more deposit items and a hold limit for the payee account.

As represented by the block 640, the apparatus having the process flow 600 is configured to determine whether the total deposit amount for the single deposit transaction is greater than the hold limit for the payee account. If not (i.e., the total deposit amount is less than or equal to the hold limit), then the apparatus is configured to determine a "positive" hold decision for each of the deposit items, e.g., one that recommends no hold for (and/or places no hold on) each and every deposit item in the single deposit transaction, as represented by the block 650. As such, in some embodiments, funds equal to the total deposit amount for the single deposit transaction will be made immediately available to the payee account and/or payee.

However, if the total deposit amount for the single deposit transaction is greater than the hold limit for the payee account, then the apparatus having the process flow 600 is configured to determine a reduced total deposit amount for the single deposit transaction by subtracting the highest deposit amount (and/or the deposit item having the highest deposit amount) from the total deposit amount (and/or from the single deposit transaction), as represented by the block 660. (If there are two or more deposit items in the single deposit transaction that have the same highest deposit amount, then the apparatus having the process flow 600 can be configured to subtract only one of those amounts (and/or only one of those deposit items) from the total deposit amount (and/or from the single deposit transaction).) It will be understood that, in some alternative embodiments, the apparatus having the process flow 600 is configured to determine the reduced total deposit amount by subtracting the deposit amount of the deposit item having the highest scalar $\alpha_3$ value (and/or that deposit item) from the total deposit amount (and/or from the single deposit transaction).

As represented by the block 670, the apparatus is also configured to then determine whether the reduced total deposit amount for the single deposit transaction is greater than the hold limit for the payee account. If so, then the apparatus is configured to determine a "negative" hold decision for each of the deposit items, e.g., one that recommends a hold for (and/or places a hold on) each and every deposit item in the single deposit transaction, as represented by the block 680.

On the other hand, if the reduced total deposit amount for the single deposit transaction is not greater than the hold limit for the payee account (i.e., the reduced total deposit amount is less than or equal to the hold limit), then the apparatus having the process flow 600 is configured to determine a hold decision for the single deposit transaction that (a) recommends a hold for (and/or places a hold on) the deposit item having the highest deposit amount (and/or highest scalar $\alpha_3$ value) in the single deposit transaction, and (b) recommends no hold for (and/or does not place a hold on) the other deposit items in the single deposit transaction, as represented by the block 690. As such, in some embodiments, funds equal to the reduced total deposit amount for the single deposit transaction will be made immediately available to the payee account and/or to the payee, and the deposit amount of the deposit item having the highest deposit amount will be held.

As an example, suppose a payee deposits three paper checks into the payee's checking account at an ATM during a single deposit transaction. The first paper check has an actual deposit amount (i.e., a check amount) of $45, the second paper check has an actual deposit amount of $250, and the third deposit item has an actual deposit amount of $120. Suppose also that the payee account has a hold limit of $400 (e.g., determined using Equation 1 and/or Tables 1-3, etc.), and that the total deposit amount for the single deposit transaction is $415 (i.e., 45+250+120=415). Given the parameters of this example, in accordance with an embodiment of the present invention, an apparatus having the process flow 600 would compare the total deposit amount for the single deposit transaction to the hold limit for the payee account, and determine that the total deposit amount is greater than the hold limit (i.e., $415>$400). As such, the apparatus would then determine a reduced total deposit amount of $165 for the single deposit transaction by subtracting the highest deposit amount from the total deposit amount (i.e., 415−250=165). Afterwards, the apparatus would compare the reduced total deposit amount to the hold limit, and determine that the reduced total deposit amount is less than the hold limit (i.e., $165<$400). Accordingly, the apparatus having the process flow 600 would determine a hold decision for the single deposit transaction that (a) recommends a hold for (and/or places a hold on) the second paper check (i.e., the deposit item having the highest deposit amount of $250), and (b) recommends no hold for (and/or does not place a hold on) the first paper check and third paper check in the single deposit transaction. In this example, in accordance with some embodiments, funds equal to $165 (i.e., the sum of the deposit amounts of the first paper check and second paper check) would be made immediately available to the payee account and/or to the payee, and the $250 deposit amount of the second paper check would be held.

It will be understood that, for practical reasons (e.g., time, cost, technology constraints, etc.), when the total deposit amount for the single deposit transaction is greater than the hold limit for the payee account, the apparatus having the process flow 600 is configured to determine a hold decision after only one subtraction (i.e., after subtracting the highest deposit amount from the total deposit amount). In other words, even when the reduced total deposit amount is greater than the hold limit, the apparatus is not configured to determine and use an additional reduced total deposit amount (e.g., by subtracting the second highest deposit amount from the reduced total deposit amount, and so on) for the single deposit transaction. As such, when the total deposit amount is greater than the hold limit, the apparatus having the process flow 600 is configured to determine an item-level hold decision only for the deposit item having the highest deposit amount. The apparatus is not configured to determine an item-level hold decision for the other deposit items because, as represented by the blocks 680-690, those deposit items are considered together.

However, it will be understood that, in an alternative embodiment of the process flow 600, an apparatus can be configured to repeat one or more of the steps of the process flow 600 in order to determine an item-level hold decision for each and every deposit item in the single deposit transaction. In this alternative embodiment, it will be understood that the apparatus is configured to determine additional reduced total deposit amounts for the single deposit transaction (e.g., by subtracting the second highest deposit amount in the single deposit transaction from the reduced total deposit amount, and so on) until one of those additional reduced total deposit amounts is less than the hold limit for the payee account.

For example, suppose the hold limit for a payee account is $200, and suppose three deposit items in a single deposit transaction are deposited into that payee account. The deposit amount for the first deposit item is $155, the deposit amount for the second deposit item is $100, and the deposit amount for the third deposit item is $210, such that the total deposit amount for the single deposit transaction is $465 (i.e., 155+100+210=465). Given these parameters, an apparatus configured to determine and use additional reduced total deposit amounts in the alternative embodiment of the process flow 600 described above would initially determine that the total deposit amount of $465 is greater than the hold limit of $200. Then, this apparatus would determine a reduced total deposit amount of $255 for the single deposit transaction by subtracting the deposit amount for the third deposit item from the total deposit amount (i.e., 465−210=255). Afterwards, the apparatus would determine that the reduced total deposit amount of $255 is still greater than the hold limit of $200. Accordingly, the apparatus would then determine an additional reduced total deposit amount of $100 by subtracting the deposit amount for the first deposit item from the reduced total deposit amount (i.e., 255−155=100). Thereafter, the apparatus would determine that the additional reduced total deposit amount of $100 is less than the hold limit of $200. As such, the apparatus would determine a hold decision that recommends a hold for (and/or places a hold on) the first deposit item and the third deposit item but not the second deposit item. Thus, it will be understood that this apparatus is configured to determine a hold decision for each and every deposit item in the single deposit transaction.

It will also be understood that the apparatus having the process flow 600 can be configured to implement any one or more portions of the process flows 100, 200, 300, 400, and/or 500 previously described herein. For example, in some embodiments, the apparatus having the process flow 600 is configured to determine a hold limit for the payee account, as represented by the block 630, based at least partially on: (a) an account balance associated with the payee account, and (b) one or more other characteristics associated with the payee account. In some embodiments, the apparatus having the process flow 600 is configured to determine the hold limit for the payee account in accordance with Equation 1 and/or Tables 1-3 previously described herein.

As another example, in some embodiments, the apparatus having the process flow 600 is configured to determine and use an adjusted total deposit amount in place of the total deposit amount referred to in the block 620, where the adjusted total deposit amount equals the sum of the adjusted deposit amounts for the deposit items in the single deposit transaction. In such embodiments, the apparatus having the process flow 600 is configured to determine the adjusted deposit amount for each deposit item in the single deposit transaction based at least partially on: (a) the actual deposit amount identified by the deposit item, and (b) one or more characteristics associated with a drawer account, where the drawer account includes an account on which the deposit item is drawn. In some of these embodiments, the apparatus having the process flow 600 is configured to determine the adjusted deposit amount for each deposit item in accordance with Equation 2 and/or Table 4 previously described herein. As such, in some embodiments of the present invention, the apparatus having the process flow 600 is configured to determine a reduced adjusted total deposit amount, as represented by the block 660, by subtracting the highest adjusted deposit amount from the adjusted total deposit amount, and then use that reduced adjusted total deposit amount to determine one or more hold decisions, as represented by the blocks 670-690.

Referring now to FIG. 7, a system 700 for determining, communicating, and/or executing hold decisions is provided, in accordance with an embodiment of the present invention. As illustrated, the system 700 includes a network 710, a teller interface apparatus 720, a hold decision apparatus 730, and a misrepresentation prevention datastore 740. FIG. 7 also illustrates a payee account 733 (e.g., a checking account, savings account, money market account, etc.), which is operatively connected (e.g., linked) to the hold decision apparatus 730. Also shown in FIG. 7 is a payee 702 that holds the payee account 733, a teller 704, a receipt 708, and a single deposit transaction 706 that includes a first deposit item 711, a second deposit item 712, and on up to an nth deposit item 713. It will be understood that each of the deposit items 711, 712, and 713 in the single deposit transaction 706 includes an actual deposit amount (not shown) identified by the deposit item, each deposit item is drawn on a drawer account (not shown), and each deposit item is received in the payee account 733. It will also be understood that, in some embodiments, one or more of the deposit items 711, 712, and 713 in the single deposit transaction 706 are associated with the same drawer account (and/or drawer), but in other embodiments, one or more of the deposit items 711, 712, and 713 are associated with a different drawer account (and/or drawer).

As shown, FIG. 7 illustrates the payee 702 interacting with the teller 704 at the teller interface apparatus 720 in order to deposit each of the deposit items 711, 712, and 713 in the single deposit transaction 706 into the payee account 733. It will be understood that, in accordance with some embodiments of the present invention, the network 710, the hold decision apparatus 730, the teller interface apparatus 720, and/or the payee account 733 are maintained by the same financial institution. It will also be understood that, in accordance with some embodiments of the present invention, the mispresentation prevention datastore 740 is configured to store information associated with one or more characteristics associated with one or more drawer accounts. In accordance with some embodiments, the mispresentation prevention datastore 740 is maintained by an entity other than the financial institution described above. In other embodiments, however, the fraud prevention datastore 740 is maintained by the financial institution that maintains the payee account 733, the drawer account (not shown), and/or any of the other portions of the system 700.

As shown in FIG. 7, the teller interface apparatus 720, the hold decision apparatus 730, and the misrepresentation prevention datastore 740 are each operatively and selectively connected to the network 710, which may include one or more separate networks. In addition, the network 710 may include a local area network (LAN), a wide area network (WAN), and/or a global area network (GAN), such as the Internet. It will also be understood that the network 710 may be secure and/or unsecure and may also include wireless and/or wireline technology.

The teller interface apparatus 720 may include any computerized apparatus that can be configured to perform any one or more of the functions of the teller interface apparatus 720 described and/or contemplated herein. For example, in some embodiments, the teller interface apparatus 720 is embodied as a computer terminal, a public kiosk, a personal computer, a network device, and/or the like. As illustrated in FIG. 7, in accordance with some embodiments of the present invention, the teller interface apparatus 720 includes a communication interface 722, a processor 724, a memory 726 having a teller application 727 stored therein, a teller interface 729, a scanner 721, and a receipt printer 723. In such embodiments, the processor 724 is operatively and selectively connected to the communication interface 722, the teller interface 729, the memory 726, the scanner 721, and the receipt printer 723.

Each communication interface described herein, including the communication interface 722, generally includes hardware, and, in some instances, software, that enables a portion of the system 700, such as the teller interface apparatus 720, to send, receive, and/or otherwise communicate information to and/or from the communication interface of one or more other portions of the system 700. For example, the communication interface 722 of the teller interface apparatus 720 may include a modem, server, electrical connection, and/or other electronic device that operatively connects the teller interface apparatus 720 to another electronic device, such as the electronic devices that make up the hold decision apparatus 730.

Each processor described herein, including the processor 724, generally includes circuitry for implementing the audio, visual, and/or logic functions of that portion of the system 700. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the teller application 727 of the memory 726 of the teller interface apparatus 720.

Each scanner described herein, including the scanner 721 shown in FIG. 7 and the scanner 821 shown in FIG. 8, generally includes hardware, and, in some instances, software, that enables the scanner to scan an image of a deposit item. For example, in some embodiments, the scanner is embodied as an optical scanner that includes a camera configured to take a digital photograph of a deposit item and/or otherwise generate one or more scanned images representing the front and/or back of the deposit item. In addition to generating an image of a deposit item, in some embodiments, the scanner is configured to read magnetically printed information, such as magnetic ink that is typically printed on a check, and/or perform magnetic ink character recognition (MICR) to obtain information associated with a deposit item from the deposit item.

Each memory device described herein, including the memory 726 for storing the teller application 727 and other data, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the apparatus in which it resides to implement the functions of that apparatus.

As shown in FIG. 7, the memory 726 includes the teller application 727. In some embodiments, the teller application 727 includes a dashboard application, network browser, and/or some other application for communicating with, navigating, controlling, configuring, and/or using the hold decision apparatus 730 and/or one or more other portions of the system 700. For example, in some embodiments, the teller 704 uses the teller application 727 to initiate, perform, and/or configure one or more aspects and/or functions of the hold decision apparatus 730. For example, in some embodiments, the teller 704 uses the teller application 727 to communicate a scanned image of the deposit item 711 to the hold decision apparatus 730, so that the hold decision apparatus 730 can determine a hold decision for the deposit item 711 and then communicate that hold decision back to the teller interface apparatus 720 and/or teller application 727.

As another example, in some embodiments, upon receiving information associated with a hold decision from the hold decision apparatus 730, the teller application 727 is configured to communicate one or more portions of that information to the receipt printer 723, such that the one or more portions of the information associated with the hold decision (e.g., whether the deposit item is being held, an amount of hold time, etc.) can be printed onto the receipt 708 for the payee 702. In some embodiments, the teller application 727 includes computer-executable program code portions for instructing the processor 724 to perform one or more of the functions of the teller application 727 described and/or contemplated herein. In some embodiments, the teller application 727 may include and/or use one or more network and/or system communication protocols.

The teller interface apparatus 720 also includes the teller interface 729. It will be understood that each user interface described herein, including the teller interface 729 shown in FIG. 7 and the user interface 829 shown in FIG. 8, includes one or more user output devices, such as a display and/or speaker, for presenting information to the teller 704, the payee 702, and/or some other user (e.g., the payee/ATM user in FIG. 8). In some embodiments, the user interface includes one or more user input devices, such as one or more buttons, keys, dials, levers, directional pads, joysticks, accelerometers, controllers, microphones, touchpads, touchscreens, haptic interfaces, microphones, scanners, motion detectors, cameras, magnetic card readers (e.g., for reading the magnetic strip on magnetic cards such as ATM and/or bank cards, etc.) and/or the like for receiving information from the teller 704, the payee 702, and/or some other user. In some embodiments, the user interface includes the input and display devices of a computer terminal, such as a keyboard and monitor, that are operable to receive and display information associated with determining, communicating, and/or executing a hold decision for a deposit item.

FIG. 7 also illustrates a hold decision apparatus 730, in accordance with an embodiment of the present invention. The hold decision apparatus 730 may include any computerized apparatus that can be configured to perform any one or more of the functions of the hold decision apparatus 730 described and/or contemplated herein. In accordance with some embodiments, for example, the hold decision apparatus 730 may include an engine, platform, server, database system, front end system, back end system, personal computer system, and/or the like. In some embodiments, such as the one illustrated in FIG. 7, the hold decision apparatus 730 includes a communication interface 732, a processor 734, and a memory 736, which includes a hold application 737 and an account datastore 738 stored therein. As shown, the communication interface 732 is operatively and selectively connected to the processor 734, which is operatively and selectively connected to the memory 736.

It will be understood that the hold application 737 can be configured to implement any one or more portions of any one or more of the process flows described and/or contemplated herein. For example, in some embodiments, the hold application 737 is configured to determine a hold decision for each of the deposit items 711, 712, and 713 in the single deposit transaction 706. As another example, in some embodiments, the hold application 737 is configured to determine a hold limit for the payee account 733 based at least partially on (a) an account balance associated with the payee account; and (b) one or more other characteristics associated with the payee account. As still another example, in some embodiments, the hold application 737 is configured to determine an adjusted deposit amount for each of the deposit items 711, 712, and 713 based at least partially on (a) an actual deposit amount identified by the deposit item, and (b) one or more characteristics associated with a drawer account on which that deposit item is drawn.

It will also be understood that, in some embodiments, the hold application 737 is additionally configured to provide other kinds of financial services. For example, in some embodiments, the hold application 737 may be operable to process financial transactions (e.g., deposit transactions, etc.) involving the payee account 733. In some cases, this function is performed alongside one or more of the steps described and/or contemplated herein that relate to determining hold decisions for deposit items that are received into the payee account 733.

It will also be understood that, in some embodiments, the hold application 737 is configured to communicate with the account datastore 738, the teller interface apparatus 720, the misrepresentation prevention datastore 740, and/or any one or more other portions of the system 700. For example, in some embodiments, the hold application 737 is configured to receive information associated with one or more characteristics associated with one or more drawer accounts from the misrepresentation prevention datastore 740. As another example, in some embodiments, the hold application 737 is configured to create and/or send one or more hold recommendations and/or other notifications and/or otherwise communicate information associated with a hold decision, in substantially real time, to the teller 704 at the teller interface apparatus 720 (and/or to the payee 702 at the ATM 820 illustrated in FIG. 8). It will be further understood that, in some embodiments, the hold application 737 includes computer-executable program code portions for instructing the processor 734 to perform any one or more of the functions of the hold application 737 described and/or contemplated herein. In some embodiments, the hold application 737 may include and/or use one or more network and/or system communication protocols.

In addition to the hold application 737, the memory 736 also includes the account datastore 738. In some embodiments, the account datastore 738 includes information associated with one or more financial accounts (e.g., the payee account 733, one or more drawer accounts, and/or one or more other financial accounts, etc.), including, for example, account names, persons and/or entities associated with the financial accounts, addresses associated with the financial accounts, transaction data and/or transaction history associated with the financial accounts, whether one or more financial accounts are linked to one or more other financial accounts, and/or any other type and/or amount of information. In some embodiments, the account datastore 738 may also store any information relating to determining, communicating, and/or executing hold decisions for deposit items. In some embodiments, the account datastore 738 stores information associated with online and/or mobile banking.

It will be understood that the account datastore 738 may include any one or more storage devices, including, but not limited to, datastores, databases, and/or any of the other storage devices typically associated with a computer system. It will also be understood that the account datastore 738 may store information in any known way, such as, for example, by using one or more computer codes and/or languages, alphanumeric character strings, data sets, figures, tables, charts, links, documents, and/or the like. Further, in some embodiments, the account datastore 738 may include information associated with one or more applications, such as, for example, the hold application 737. It will also be understood that, in some embodiments, the account datastore 738 provides a substantially real-time representation of the information stored therein, so that, for example, when the processor 734 accesses the account datastore 738, the information stored therein is current or substantially current.

It will be understood that the embodiment illustrated in FIG. 7 is exemplary and that other embodiments may vary.

For example, in accordance with some embodiments, instead of performing the single deposit transaction 706 at the teller interface apparatus via the teller 704, the payee 702 performs the single deposit transaction 706 himself or herself at the automated teller machine 820 illustrated in FIG. 8. It will be understood that, in accordance with some embodiments, the ATM application 827 is configured to perform any and/or all of the same functions performed by the teller application 727 illustrated in FIG. 7.

As another example, in some embodiments, some or all of the portions of the system 700 (and/or the system 800) may be combined into a single portion. Specifically, in some embodiments, the teller interface apparatus 720 (and/or the ATM 820) and the hold decision apparatus 730 are combined into a single user interface and hold decision apparatus configured to perform all of the same functions of those separate portions as described and/or contemplated herein. Likewise, in some embodiments, some or all of the portions of the system 700 (and/or the system 800) may be separated into two or more distinct portions.

In addition, the various portions of the system 700 may be maintained for by the same or separate parties. For example, as previously mentioned, a single financial institution may maintain the payee account 733, the hold decision apparatus 730, and the teller interface apparatus 720 (and/or the ATM 820). However, in other embodiments, hold decision apparatus 730 and the teller interface apparatus 720 (and/or the ATM 820) are maintained by separate entities.

It will also be understood that the system 700 (and/or the system 800) may include and/or implement any embodiment of the present invention described and/or contemplated herein. For example, in some embodiments, the system 700 (and/or the system 800) is configured to implement any one or more of the embodiments of the process flow 100 described and/or contemplated herein in connection with FIG. 1, any one or more of the embodiments of the process flow 200 described and/or contemplated herein in connection with FIG. 2, any one or more of the embodiments of the process flow 300 described and/or contemplated herein in connection with FIG. 3, any one or more of the embodiments of the process flow 400 described and/or contemplated herein in connection with FIG. 4, any one or more of the embodiments of the process flow 500 described and/or contemplated herein in connection with FIG. 5, any one or more of the embodiments of the process flow 600 described and/or contemplated herein in connection with FIG. 6, and/or any one or more of the embodiments of the process flow 900 described and/or contemplated herein in connection with FIG. 9.

Specifically, in accordance with an embodiment of the present invention, (1) the communication interface 732 of the hold decision apparatus 730 is configured to receive, from the automated teller machine 820, information associated with the deposit item 711, as represented by the block 110 in FIG. 1; (2) the hold application 737 of the hold decision apparatus 730 is configured to cause the processor 734 to determine, based at least partially on the information associated with deposit item 711, a deposit amount associated with the deposit item 711 and a payee account (i.e., the payee account 733) to receive the deposit item 711, as represented by the block 120 in FIG. 1; (3) the hold application 737 is configured to cause the processor 734 to determine a hold limit for the payee account 733, as represented by the block 130 in FIG. 1; (4) the hold application 737 is configured to cause the processor 734 to compare the deposit amount to the hold limit, as represented by the block 140 in FIG. 1; (5) the hold application 737 is configured to cause the processor 734 to determine a hold decision for the deposit item 711 based at least partially on comparing the deposit amount to the hold limit, as represented by the block 150 in FIG. 1; and (6) the communication interface 732 of the hold decision apparatus 730 is configured to communicate information associated with the hold decision to the ATM 820, as represented by the block 160 in FIG. 1.

Referring now to FIG. 9, a mixed block and flow diagram of a system 900 for determining and communicating a hold decision for a deposit item in substantially real time is provided, in accordance with a more-detailed embodiment of the present invention. As shown, the system 900 includes an ATM 902 (e.g., the ATM 820 shown in FIG. 8, etc.) and a hold decision apparatus 904 (e.g., the hold decision apparatus 730 shown in FIGS. 7 and 8, etc.). It will be understood that the ATM 902 and the hold decision apparatus 904 are operatively and selectively connected to each other via a network (not shown). It will also be understood that, in accordance with some embodiments, the ATM 902 is accessible to a payee (not shown), the hold decision apparatus is maintained by a financial institution, and the payee holds a payee account that is maintained by the financial institution.

As represented by the block 905, the payee deposits a deposit item at the ATM 902 during a single deposit transaction, whereupon the ATM 902 receives and scans the deposit item during the single deposit transaction. Then, as represented by the block 910, the ATM 902 communicates a scanned image of the deposit item to the hold decision apparatus 904 during the single deposit transaction. As represented by the block 915, the hold decision apparatus 904 receives and reads the scanned image of the deposit item to determine (a) the actual deposit amount for the deposit item, (b) a payee account to receive the deposit item, and (c) a drawer account associated with the deposit item, in accordance with any one or more of the ways previously described herein.

Then, as represented by the block 920, the hold decision apparatus 904 determines a hold limit for the payee account based at least partially on (a) an account balance associated with the payee account, and (b) one or more other characteristics associated with the payee account. As represented by the block 925, the hold decision apparatus 904 also determines an adjusted deposit amount for the deposit item based at least partially on (a) the actual deposit amount identified by the deposit item, and (b) one or more characteristics associated with the drawer account. Thereafter, as represented by the block 930, the hold decision apparatus 904 determines a hold decision for the deposit item based at least partially on a comparison of the adjusted deposit amount to the hold limit (e.g., the hold decision is based at least partially on whether the adjusted deposit amount is greater than, less than, or equal to the hold limit, etc.).

Once a hold decision for the deposit item has been determined, the hold decision apparatus 904 communicates information associated with the hold decision (e.g., the result of the hold decision, an amount of hold time associated with the hold decision, etc.) to the ATM 902 during the single deposit transaction, as represented by the block 935. Thereafter, as represented by the block 940, the ATM 902 receives, during the single deposit transaction before the payee leaves the ATM 902, the information associated with the hold decision, and the ATM 902 indicates to the payee, during the single deposit transaction before the payee leaves the ATM 902, an amount of hold time for the deposit item.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method comprising:
   receiving information associated with a deposit item;
   determining an actual deposit amount identified by the deposit item based at least partially on the information associated with the deposit item;
   determining a payee account to receive the deposit item based at least partially on the information associated with the deposit item;
   determining a drawer account on which the deposit item is drawn based at least partially on the information associated with the deposit item;
   determining a hold limit for the payee account;
   determining, using a processor, an adjusted deposit amount for the deposit item based at least partially on the actual deposit amount identified by the deposit item multiplied by a scalar, wherein the value of the scalar is based at least partially on the one or more characteristics associated with the drawer account; and
   determining, using a processor, a hold decision for the deposit item based at least partially on a comparison of the adjusted deposit amount to the hold limit.

2. The method of claim 1, wherein the one or more characteristics associated with the drawer account comprise one or more characteristics associated with a drawer, wherein the drawer is associated with the drawer account.

3. The method of claim 1, wherein the one or more characteristics associated with the drawer account comprise one or more characteristics associated with the deposit item.

4. The method of claim 1, wherein the one or more characteristics associated with the drawer account comprise at least one of: (a) an account age associated with the drawer account, or (b) an account type associated with the drawer account.

5. The method of claim 1, wherein the one or more characteristics associated with the drawer account comprise at least one of: (a) a record that the drawer account has gone to loss due to funds not being available for a transaction, (b) an uncollected funds record associated with the drawer account, (c) a dormant/inactive status associated with the drawer account, (d) a record associated with the drawer account of producing unauthorized monetary replicas, (e) an account not located status associated with the drawer account, or (f) a lost/stolen status associated with the drawer account.

6. The method of claim 1, wherein determining the hold limit for the payee account comprises:
   determining the hold limit for the payee account based at least partially on: (a) an account balance associated with the payee account, and (b) one or more other characteristics associated with the payee account.

7. The method of claim 6, wherein the one or more other characteristics associated with the payee account comprise at least one of: (a) a total liability balance associated with the payee account, or (b) a record that the payee account has gone to loss due to funds not being available for a transaction.

8. The method of claim 1, wherein determining the hold limit for the payee account comprises:
   determining the hold limit for the payee account based at least partially on an account balance associated with the payee account multiplied by a scalar, wherein the value of the scalar is based at least partially on one or more other characteristics associated with the payee account.

9. The method of claim 1, further comprising communicating, using a communication interface, information associated with the hold decision for the deposit item to at least one of: (a) an automated teller machine (ATM), or (b) a teller interface apparatus operable by a human teller.

10. The method of claim 1, wherein the deposit item comprises an item in a single deposit transaction, and wherein receiving the information associated with the deposit item and determining the hold decision for the deposit item are both performed during the single deposit transaction.

11. An apparatus comprising:
    a communication interface configured to receive information associated with a deposit item; and
    a processor configured to:
      determine an actual deposit amount identified by the deposit item based at least partially on the information associated with the deposit item;
      determine a payee account to receive the deposit item based at least partially on the information associated with the deposit item;
      determine a drawer account on which the deposit item is drawn based at least partially on the information associated with the deposit item;
      determine a hold limit for the payee account;
      determine an adjusted deposit amount for the deposit item based at least partially on actual deposit amount identified by the deposit item multiplied by a scalar, wherein the value of the scalar is based at least partially on the one or more characteristics associated with the drawer account; and
      determine a hold decision for the deposit item based at least partially on a comparison of the adjusted deposit amount to the hold limit.

12. The apparatus of claim 11, wherein the one or more characteristics associated with the drawer account comprise at least one of: (a) an account age associated with the drawer account, or (b) an account type associated with the drawer account.

13. The apparatus of claim 11, wherein the one or more characteristics associated with the drawer account comprise at least one of: (a) a record that the drawer account has gone to loss due to funds not being available for a transaction, (b) an uncollected funds record associated with the drawer account, (c) a dormant/inactive status associated with the drawer account, (d) a record associated with the drawer account, (e) an account not located status associated with the drawer account of producing unauthorized monetary replicas, or (f) a lost/stolen status associated with the drawer account.

14. The apparatus of claim 11, wherein the processor is configured to determine the hold limit for the payee account based at least partially on (a) an account balance associated with the payee account, and (b) one or more other characteristics associated with the payee account.

15. The apparatus of claim 11, wherein the processor is configured to determine the hold limit for the payee account based at least partially on an account balance associated with the payee account multiplied by a scalar, wherein the value of the scalar is based at least partially on one or more other characteristics associated with the payee account.

16. The apparatus of claim 11, wherein the deposit item comprises an item in a single deposit transaction,
   wherein the communication interface is configured receive the information associated with the deposit item during the single deposit transaction, and
   wherein the processor is configured to determine the hold decision for the deposit item during the single deposit transaction.

17. A computer program product comprising a computer-readable medium, wherein the computer-readable medium comprises computer-executable program code portions stored therein, wherein the computer-executable program code portions comprise:
   a first program code portion configured to receive information associated with a deposit item;
   a second program code portion configured to determine an actual deposit amount identified by the deposit item based at least partially on the information associated with the deposit item;
   a third program code portion configured to determine a drawer account on which the deposit item is drawn based at least partially on the information associated with the deposit item;
   a fourth program code portion configured to determine an adjusted deposit amount for the deposit item based at least partially on the actual deposit amount identified by the deposit item multiplied by a scalar, wherein the value of the scalar is based at least partially on the one or more characteristics associated with the drawer account; and
   a fifth program code portion configured to determine a hold decision for the deposit item based at least partially on a comparison of the adjusted deposit amount to a hold limit.

18. The computer program product of claim 17, further comprising a sixth program code portion configured to determine the hold limit based at least partially on an account balance associated with the payee account multiplied by a scalar, wherein the value of the scalar is based at least partially on one or more other characteristics associated with the payee account.

19. A method comprising:
   receiving information associated with a deposit item;
   determining an actual deposit amount identified by the deposit item based at least partially on the information associated with the deposit item;
   determining a payee account to receive the deposit item based at least partially on the information associated with the deposit item;
   determining a drawer account on which the deposit item is drawn based at least partially on the information associated with the deposit item;
   determining a hold limit for the payee account based at least partially on an account balance associated with the payee account multiplied by a scalar, wherein the value of the scalar is based at least partially on one or more other characteristics associated with the payee account;
   determining, using a processor, an adjusted deposit amount for the deposit item based at least partially on: (a) the actual deposit amount identified by the deposit item, and (b) one or more characteristics associated with the drawer account; and
   determining, using a processor, a hold decision for the deposit item based at least partially on a comparison of the adjusted deposit amount to the hold limit.

20. The method of claim 19, wherein the one or more characteristics associated with the drawer account comprise one or more characteristics associated with a drawer, wherein the drawer is associated with the drawer account.

21. The method of claim 19, wherein the one or more characteristics associated with the drawer account comprise one or more characteristics associated with the deposit item.

22. The method of claim 19, wherein the one or more characteristics associated with the drawer account comprise at least one of: (a) an account age associated with the drawer account, or (b) an account type associated with the drawer account.

23. The method of claim 19, wherein the one or more characteristics associated with the drawer account comprise at least one of: (a) a record that the drawer account has gone to loss due to funds not being available for a transaction, (b) an uncollected funds record associated with the drawer account, (c) a dormant/inactive status associated with the drawer account, (d) a record associated with the drawer account of producing unauthorized monetary replicas, (e) an account not located status associated with the drawer account, or (f) a lost/stolen status associated with the drawer account.

24. The method of claim 19, wherein determining the adjusted deposit amount for the deposit item comprises determining the adjusted deposit amount for the deposit item based at least partially on the actual deposit amount identified by the deposit item multiplied by a scalar, wherein the value of the scalar is based at least partially on the one or more characteristics associated with the drawer account.

25. The method of claim 19, wherein the one or more other characteristics associated with the payee account comprise at least one of: (a) a total liability balance associated with the payee account, or (b) a record that the payee account has gone to loss due to funds not being available for a transaction.

26. The method of claim 19, further comprising communicating, using a communication interface, information associated with the hold decision for the deposit item to at least one of: (a) an automated teller machine (ATM), or (b) a teller interface apparatus operable by a human teller.

27. The method of claim 19, wherein the deposit item comprises an item in a single deposit transaction, and wherein receiving the information associated with the deposit item and determining the hold decision for the deposit item are both performed during the single deposit transaction.

28. An apparatus comprising:
   a communication interface configured to receive information associated with a deposit item; and
   a processor configured to:
      determine an actual deposit amount identified by the deposit item based at least partially on the information associated with the deposit item;
      determine a payee account to receive the deposit item based at least partially on the information associated with the deposit item;
      determine a drawer account on which the deposit item is drawn based at least partially on the information associated with the deposit item;
      determine a hold limit for the payee account based at least partially on an account balance associated with the payee account multiplied by a scalar, wherein the value of the scalar is based at least partially on one or more other characteristics associated with the payee account;
      determine an adjusted deposit amount for the deposit item based at least partially on: (a) the actual deposit amount identified by the deposit item, and (b) one or more characteristics associated with the drawer account; and determine a hold decision for the deposit item based at least partially on a comparison of the adjusted deposit amount to the hold limit.

29. The apparatus of claim 28, wherein the one or more characteristics associated with the drawer account comprise at least one of: (a) an account age associated with the drawer account, or (b) an account type associated with the drawer account.

30. The apparatus of claim 28, wherein the one or more characteristics associated with the drawer account comprise at least one of: (a) a record that the drawer account has gone to loss due to funds not being available for a transaction, (b) an uncollected funds record associated with the drawer account, (c) a dormant/inactive status associated with the drawer account, (d) a record that the drawer account of producing unauthorized monetary replicas, (e) an account not located status associated with the drawer account, or (f) a lost/stolen status associated with the drawer account.

31. The apparatus of claim 28, wherein the processor is configured to determine the adjusted deposit amount for the deposit item based at least partially on the actual deposit amount identified by the deposit item multiplied by a scalar, wherein the value of the scalar is based at least partially on the one or more characteristics associated with the drawer account.

32. The apparatus of claim 28,
wherein the deposit item comprises an item in a single deposit transaction,
wherein the communication interface is configured receive the information associated with the deposit item during the single deposit transaction, and
wherein the processor is configured to determine the hold decision for the deposit item during the single deposit transaction.

33. A computer program product comprising a computer-readable medium, wherein the computer-readable medium comprises computer-executable program code portions stored therein, wherein the computer-executable program code portions comprise:
   a first program code portion configured to receive information associated with a deposit item;
   a second program code portion configured to determine an actual deposit amount identified by the deposit item based at least partially on the information associated with the deposit item;
   a third program code portion configured to determine a drawer account on which the deposit item is drawn based at least partially on the information associated with the deposit item;
   a fourth program code portion configured to determine an adjusted deposit amount for the deposit item based at least partially on: (a) the actual deposit amount identified by the deposit item, and (b) one or more negative characteristics associated with the drawer account;
   a fifth program code portion configured to determine the hold limit based at least partially on an account balance associated with the payee account multiplied by a scalar, wherein the value of the scalar is based at least partially on one or more other characteristics associated with the payee account; and
   a fifth program code portion configured to determine a hold decision for the deposit item based at least partially on a comparison of the adjusted deposit amount to a hold limit.

34. The computer program product of claim 33, wherein said fourth program code portion is configured to determine an adjusted deposit amount for the deposit item based at least partially on the actual deposit amount identified by the deposit item multiplied by a scalar, wherein the value of the scalar is based at least partially on the one or more characteristics associated with the drawer account.

* * * * *

UNITED STATES PATENT AND TRADEMARK OFFICE
CERTIFICATE OF CORRECTION

PATENT NO. : 8,235,282 B2
APPLICATION NO. : 12/703011
DATED : August 7, 2012
INVENTOR(S) : Ricardo Davila et al.

Page 1 of 1

It is certified that error appears in the above-identified patent and that said Letters Patent is hereby corrected as shown below:

Column 38, Claim 13, Line 53: after "drawer account" add -- of producing unauthorized monetary replicas --

Column 38, Claim 13, Lines 54-55: delete "of producing unauthorized monetary replicas"

Column 41, Claim 30, Line 15: change "that" to -- associated with --

Signed and Sealed this
Twenty-fifth Day of September, 2012

David J. Kappos
*Director of the United States Patent and Trademark Office*